US012537998B1

(12) United States Patent
Perelli-Minetti et al.

(10) Patent No.: US 12,537,998 B1
(45) Date of Patent: Jan. 27, 2026

(54) ENGAGEMENT-BASED COLLABORATION RECOMMENDATIONS

(71) Applicant: Block, Inc., San Francisco, CA (US)

(72) Inventors: Linnea Perelli-Minetti, Seattle, WA (US); Robin Standifer, Inglewood, CA (US); Forrest Durell, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 99 days.

(21) Appl. No.: 18/484,176

(22) Filed: Oct. 10, 2023

(51) Int. Cl.
*H04N 21/4788* (2011.01)
*G06Q 50/00* (2024.01)
*H04N 21/475* (2011.01)

(52) U.S. Cl.
CPC ..... *H04N 21/4788* (2013.01); *H04N 21/4756* (2013.01); *G06Q 50/01* (2013.01)

(58) Field of Classification Search
CPC . H04N 21/4788; H04N 21/4756; G06Q 50/01
See application file for complete search history.

(56) References Cited

U.S. PATENT DOCUMENTS

| 12,069,328 | B2 * | 8/2024 | Dorogusker | ............ G06F 3/165 |
| 12,219,193 | B1 * | 2/2025 | Perelli-Minetti | ........................... |
| | | | | H04N 21/25875 |
| 2018/0329992 | A1 * | 11/2018 | Shapira | .................. H04L 67/10 |
| 2021/0026897 | A1 * | 1/2021 | Rathje | ............... G06F 16/90332 |

* cited by examiner

*Primary Examiner* — Nathan J Flynn
*Assistant Examiner* — Christine A Kurien
(74) *Attorney, Agent, or Firm* — IP Spring

(57) ABSTRACT

A recommendation system is described, which identifies engaged fans for an artist and requests input from the engaged fans regarding a collaboration by the artist with at least one different artist. In implementations, engaged fans are identified as having user profiles on a media content platform that satisfy at least one threshold engagement criteria based on consumption of at least one media content item associated with the artist. The recommendation system presents a user interface that includes at least one prompt for feedback that enables engaged fans to recommend how the artist collaborate with others. In some implementations, the user interface includes controls that are selectable to define artist characteristics to feature in a collaboration and the recommendation system is configured to generate a synthesized collaboration by automatically combining different artists' characteristics using a trained machine learning model. Recommendations based on engaged fan feedback are then provided to artists.

20 Claims, 12 Drawing Sheets

ENGAGEMENT-BASED COLLABORATION RECOMMENDATIONS

TECHNICAL FIELD

Media content platforms can be implemented as dedicated applications as well as web pages and enable artists and labels to provide music or videos for subsequent streaming by users who visit and/or subscribe to the media content platform. Media content platforms monitor and record data describing one or more entities associated with individual media content items, such as profile data describing an entity, audience data describing how users of the media content platforms access or otherwise interact with media content items, and so forth. Data describing an entity is accessible by the entity via one or more interfaces of a media content platform.

DETAILED DESCRIPTION

Figure 1:
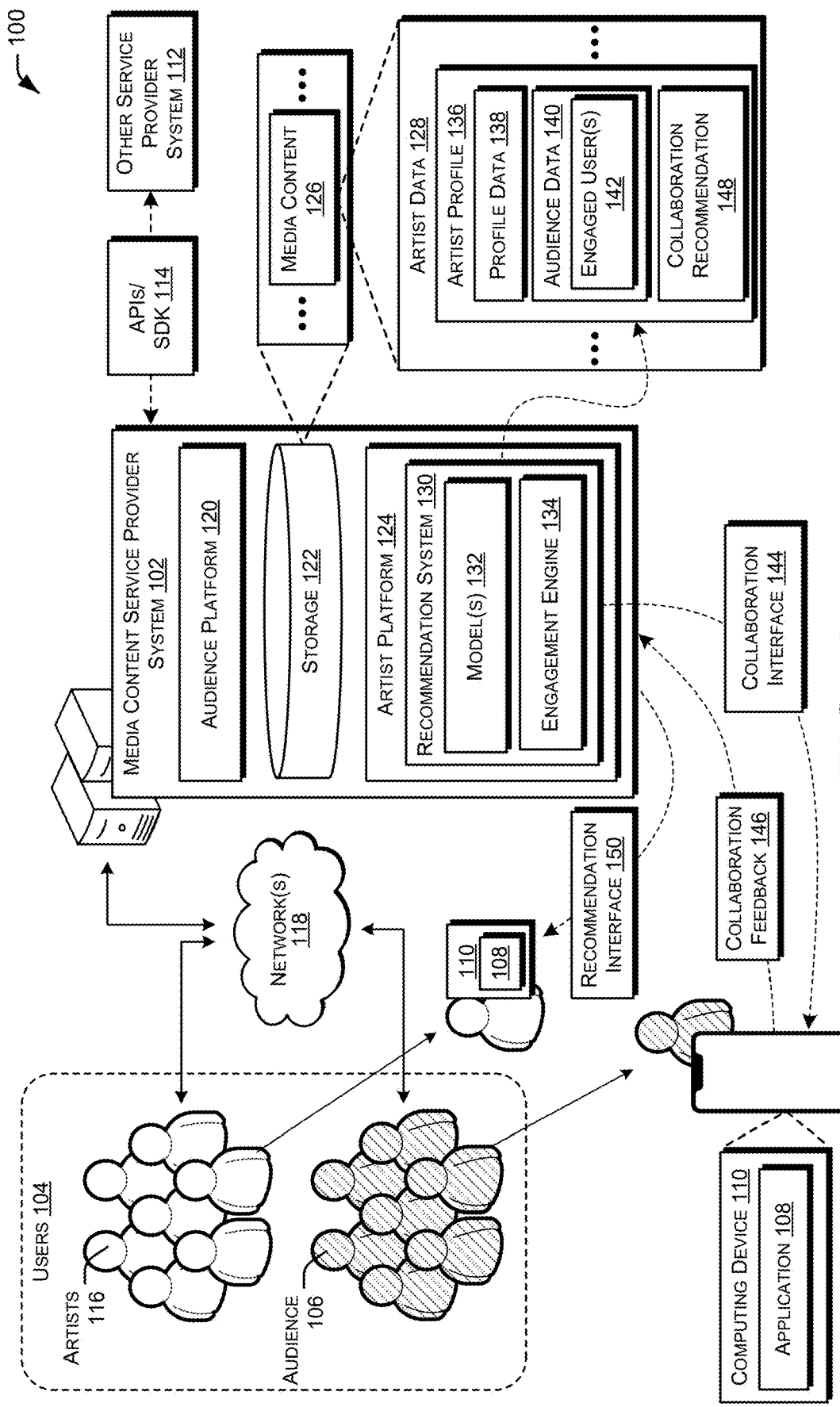
FIG. 1 is a block diagram of a non-limiting example environment for identifying an audience subset that includes engaged users for an artist, generating a collaboration interface for the engaged users, generating a collaboration recommendation for the artist based on feedback to the collaboration interface, and outputting the collaboration recommendation in a recommendation interface in accordance with implementations described herein.

Methods and systems for identifying engaged audience members for an artist, enabling the engaged audience members to provide feedback regarding the artist, and generating a recommendation for the artist to collaborate with one or more different artists based on the feedback are described herein. Artists create content in a variety of forms, such as images, music, videos, written word, and so forth, which is then consumed by an audience (e.g., viewers or listeners). Data describing how users consume an artist's content is incredibly valuable to the artist, as the data enables artists to effectively engage with their audience.

One particular area of interest pertains to consumption of artists' collaboration content-which refers to content created by two or more different artists. Traditionally, artists are left to their own best guess as to other artists that make similar content or that make content which might be suitable in collaboration with the artist's own content. Consequently, the substantive amount of time and resources required to initiate a collaboration, coupled with the uncertainty as to whether a collaboration attempt will succeed or fail, discourages many artists from attempting to engage in a collaboration effort to create new content.

To assist artists in collaboration efforts, conventional systems rely on artist-based signals (e.g., a genre with which two or more artists are commonly associated, a collaboration history between artists, and so forth) as the sole basis for generating artist collaboration recommendations. These conventional systems, however, do not account for audience-based signals, and consequently generate collaboration recommendations based on limited signal data, which can lead to inaccurate collaboration recommendations. Some conventional systems for collaboration "cast a wide net," by providing numerous recommendation communications in the hopes that a small percentage will result in a successful collaboration, which utilizes large amounts of computational resources and network bandwidth as well as overwhelming artists with irrelevant recommendations. For example, conventional approaches may involve the transmission of numerous and ad-hoc communications across various communication channels and/or mediums, e.g., email, phone, text, messenger platforms, social media platforms, etc., and may involve exposure of personal information, e.g., a username. This can result in wasted communications using channels that are not frequently used by user accounts and/or this can cause such electronic messages to get lost amongst thousands of unread messages or posts received over various platforms.

Some conventional approaches for requesting audience feedback regarding an artist include public polls, such as a survey presented to the general public (e.g., via one or more social media platforms) requesting input regarding what artists people would like to see collaborate. These conventional approaches to obtaining others' feedback, however, are often problematic as there is little trust associated with survey results, and there exist few technical mechanisms that prevent illicit voting (e.g., by bots or by individual users voting multiple times using different email addresses or accounts to mimic votes by different users). Communications pertaining to collaboration recommendations (e.g., from members of an audience and/or from other artists) are similarly unreliable, particularly as artists gain notoriety, which leads to increased spam communications and difficulty in filtering legitimate communications.

Given the lack of technical mechanisms to prevent illicit voting and filter between legitimate and spam communications, conventional approaches to generating artist collaboration recommendations produce unreliable results, thus dissuading artists from trusting the results and frustrating the collaboration recommendation objective.

To address these challenges, a media content platform identifies fans that have a threshold engagement with a particular artist and offers these engaged fans the opportunity to share insights/provide recommendations regarding how an artist might collaborate with one or more different artists to create content. As described herein, a "fan" refers to an individual user account that is verified by the media content platform as representing a human and that satisfies one or more engagement criteria for a particular artist. Fan-provided recommendations and insights are then presented to the respective artist(s) via the media content platform to indicate to the artist(s) what their engaged fans think about future creations.

The media content platform hosts media content items created, and monitors consumption (e.g., views, listens, streams, etc.) of individual media content items and tracks respective data points for each media content item (e.g., for musical media content items-listener demographics, number of unique listeners, listener geolocation, etc.). Based on these tracked data points, the media content platform identifies engaged fans for an artist.

Identifying engaged fans for an artist is configurable based on various combinations of data points and/or input signals and respective threshold values for various data points. Data points and input signals may be monitored by user account activity on the media content platform, and/or may be monitored based on input data points or input signals from other platforms (e.g., one or more third party platforms). For instance, in some implementations engaged fans are identified based on a volume of streams of an artist's media content items (e.g., threshold number of streams, threshold percentage of streams for the individual fan attributed to a particular artist, etc.). Other data points include whether the fan follows the artist on social media, whether the fan shares the artist with others, whether the fan attends concerts, how the fan navigated to the artist's content on the media content platform (e.g., directly from the artist's page, via a search for the artist, by listening to similar artists, via a curated playlist, etc.), whether the fan has purchased artist merchandise, whether the fan supports the artist on other platforms, and so forth.

In addition to verifying an individual user account as a fan (e.g., by verifying users via a registered account with the media content platform, via a verifiable credential issued by a trusted third-party issuer, via a proof-of-human test, etc.), in some implementations the media content platform weights data related to a fan while determining whether a fan satisfies the threshold criteria as being an engaged fan for an artist.

After identifying a subset of users who satisfy the threshold criteria as being engaged fans for an artist, the media content platform outputs a user interface that prompts the engaged fans to provide feedback/suggestions regarding different artists with which the artist is recommended to collaborate. In some implementations, the media content platform selectively outputs the user interface as part of a fan's current experience (e.g., outputs the user interface when the fan is listening to an artist's music; submits an invite to join a collaborative fan space during a limited (e.g., predetermined) time window when the fan is on the media content platform; etc.).

In some implementations, the user interface is configured as a collaborative fan space that enables different "engaged fans" to interact with one another and provide collaboration suggestions for an artist. In some implementations, the user interface includes generative controls that enable fans to create synthetic collaborations that feature selected aspects from their favorite artists (e.g., tools that enable users to select parts of artist tracks that they enjoy, such as vocals, hooks, beat, and other audible characteristics), and provide the selected portion(s) as input to one or more machine learning models trained to synthetically generate a song based on the inputs. In some implementations, the user interface includes a preview of collaboration attempts and/or synthetically generated content to provide artists feedback during the artists' creation process.

As noted above, by first verifying that an individual user account satisfies the threshold requirements of being an engaged fan for an artist, the media content platform protects against spam communications that might otherwise originate from an individual user account that fails to satisfy the requirements (e.g., account verification and threshold criteria satisfaction) of being an engaged fan. By reducing spam communications, the media content platform thus reduces processing resources and network traffic that would otherwise result from an artist having to manually filter out unwanted communications, storing spam communications, responding to spam communications, and so forth.

The preceding description is provided for the purposes of summarizing some example implementations to provide a basic understanding of aspects of the subject matter described herein. Accordingly, the above-described features are merely examples and are not limiting in any way. Other features, aspects, and advantages of the subject matter described herein will become apparent from the following description of the figures and claims.

FIG. 1 is a block diagram of a non-limiting example environment 100 for identifying a subset of users that have exhibited a threshold level of engagement with an artist, outputting a collaboration interface that prompts the subset of users for input regarding a collaboration between the artist and at least one other artist, generating a recommendation based on feedback from the subset of users, and outputting the recommendation to the artist via a recommendation interface. In one implementation, the environment 100 includes a media content service provider system 102 and a population of users 104 of the media content service provider system 102. In implementations, the media content service provider system 102 is a music service provider system that, at least in part, provides media content items (e.g., by streaming media such as by streaming music, streaming video, combinations thereof, and so forth) to an audience 106 comprised of at least one of the users 104. In implementations, for instance, the media content service provider system 102 is, or includes, an application 108.

As an example, the media content service provider system 102 is, or includes, a subscription-based digital media streaming application, which executes on a computing device (e.g., a mobile phone or other computing device) with media content items stored on a remote server, such as on a server implementing and/or associated with the media content service provider system 102. In this manner, media content items provided by the media content service provider system 102 (e.g., via application 108) are either streamed offline (e.g., cached locally on computing device executing the application 108, such as computing device 110) or streamed online with content streaming in packets.

Hence, the media content service provider system 102 is representative of a digital audio streaming service (e.g., for music and/or podcasts), a digital video streaming service, or a streaming service that provides streaming of various different types of digital media or multimedia. In some implementations, such a streaming service is subscription-based, so as to allow the users 104 to stream digital media items (e.g., songs, podcasts, videos, combinations thereof, and so forth) on-demand from a centralized library provided by the media content service provider system 102.

Alternatively or additionally, the application 108 of the media content service provider system 102 is configured to provide access to functionality provided by at least one other service provider system 112 (e.g., at least one service provider system other than the media content service provider system 102). The service provider system 112, for instance, is representative of a system that is or deploys at least one application, such as a media streaming application, a lending application, a payment application, an appointment application, a loyalty application, a social media application, combinations thereof, and so forth. In implementations, the service provider system 112 is communicatively coupled to the application 108 via dedicated application programming interfaces (APIs) and/or software development kits (SDKs) 114 (referred to hereinafter as "APIs/SDKs 114").

In some implementations, the service provider system 112 is representative as a source of media content items, such as a source of media content items that are provided to users 104 via the media content service provider system 102. For instance, in an example scenario the service provider system 112 is representative of a music label that provides media content to the media content service provider system 102 in the forms of songs, albums, and so forth (e.g., via a distributor). Alternatively or additionally, the service provider system 112 is representative of an artist, a distributor, or the like which provides media content to the media content service provider system 102 (e.g., by uploading the media content via an application installed on a client device).

The users 104 access the media content service provider system 102 via one or more computing devices, which are each configured to execute the application 108. In at least one implementation, individual ones of the users 104 are registered via one or more user accounts with the media content service provider system 102. Alternatively or additionally, one or more of the users 104 access media content via the media content service provider system 102 independent of (e.g., without) signing up for a user account or otherwise registering via an account or profile with the media content service provider system 102. In at least some scenarios where one or more of the users 104 have not registered with the media content service provider system 102 via a user account, user profile, or the like, such users are referred to as "unregistered users." In some implementations, unregistered users are permitted to access media content from the media content service provider system 102 in a provisional manner (e.g., access media content in under time-restricted conditions, such as being able to preview 30 seconds of audio content).

In accordance with the described techniques, one or more of the users 104 are designated by the media content service provider system 102 as "artists," thus forming a population of users that are artists 116. In one or more implementations, the media content service provider system 102 provides the "artist" designation to users that have provided digital evidence that those users generate media content for the media content service provider system 102, for other service providers, for live events (e.g., performances, podcasts, public appearances, social media posts, etc.), and/or for exposure to an audience in various ways. In one or more implementations, the media content service provider system 102 activates the "artist" designation for a user 104 by updating data (e.g., one or more fields) in user data maintained by the media content service provider system 102 in association with the user 104.

For instance, in an example implementation media content is received by the media content service provider system 102 from service provider system 112 with data indicating that the media content is associated with (e.g., generated by or attributed to) one or more of the users 104. In such an example implementation, the media content service provider system 102 updates user data for the one or more of the users 104 to indicate that the one or more of the users 104 is an "artist" of the media content, and thus designated as an artist 116 of the users 104.

Individual ones of the users 104 are depicted as being associated with a respective computing device (e.g., computing device 110), representing how the user 104 accesses media content and functionality provided by the media content service provider system 102. For instance, the computing device 110 is depicted as including the application 108. By enabling user interaction with one or more user interfaces of the application 108, the computing device 110 provides the user 104 access to various functionalities of the media content service provider system 102. Although the computing device 110 is illustrated with respect to being associated with a user included in the population of the artists 116, in some implementations a user included in the population of the audience 106 is also included in the artists 116.

For instance, in an example scenario where a user 104 in the population of artists 116 uses the application 108 to consume media content created by themselves, by one or more other artists of the population of artists 116, or a combination thereof, the user 104 in the population of artists is similarly represented as being in the population of the audience 106. Alternatively or additionally, in implementations the computing device 110 is associated with a user included in the population of artists 116 where the user leverages the application 108 without consuming media content, either created by themselves or by other artists 116 (e.g., the user leverages the application 108 to provide (e.g., upload) media content created by themselves to the media content service provider system 102, to manage their artist profile on the media content service provider system 102, to interact with the audience 106 via the media content service provider system 102, and so forth). The computing device 110 connects the user to the media content service provider system 102 via one or more network(s) 118, one example of which is the Internet.

Computing devices that operate in the context of environment 100 (e.g., computing device 110) are configurable in a variety of manners. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below in relation to FIGS. 10-12.

The media content service provider system 102 is depicted as including audience platform 120, storage 122, and artist platform 124. The storage 122 is depicted as storing media content 126 and metadata with one or more items of media content 126, such as artist data 128. The storage 122 is configurable in a variety of manners to store data. For instance, the storage 122 is configured to include or otherwise access one or more databases, virtual storage, combinations thereof, and so forth. Alternatively or additionally, the storage 122 includes one or more data tables, data stores, combinations thereof, and so forth, which are configured as being physically or logically separated (e.g., physically remote from one another and/or partitioned to store different data in different storage partitions). The artist platform 124 is depicted as including a recommendation system 130 having one or more model(s) 132 and an engagement engine 134.

In implementations, individual artists of the population of artists 116 have an artist profile 136 in the artist data 128. The artist data 128 is depicted with ellipses to indicate that the artist data 128 includes multiple artist profiles 136 (e.g., an artist profile for an individual artist of the population of artists 116). However, for purposes of simplicity, the illustrated example of FIG. 1 depicts the artist data 128 as metadata for the media content 126 that describes a single artist associated with the media content 126. Further, although illustrated in the context of being metadata associated with media content 126, the artist data 128 is representative of data maintained in the storage 122 independent of an association with, or connection to, one or more items of media content 126. Although described herein in the context of representing a single artist of the population of artists 116, an artist profile 136 of the artist data 128 is representative of a group of multiple artists of the population of artists 116. For instance, in an example scenario a group of multiple artists or team members that form a band is represented using a single artist profile 136. As another example, a group of multiple bands, a set of individual performers, and so forth that are associated with an entity (e.g., a common music label) are represented by a single artist profile 136 in the artist data 128.

In some implementations, the artist platform 124 enables users 104 that represent individual artists of the population of artists 116, band or team members (e.g., one or more selected, permissioned members) of a band or team to create, modify, update, or edit profile data 138 for their artist profile 136. Accordingly, in one or more implementations, the artist platform 124 provides one or more user interface instrumentalities that enable an artist of the population of artists 116 to edit profile data 138 included in an artist profile 136 of the artist data 128 (e.g., via the application 108). As an example, the artist platform 124 provides a user interface instrumentality to confirm that media content 126 is correctly associated with profile data 138 for the artist. As another example, the artist platform 124 provides a user interface instrumentality to specify one or more actions taken by one of the artists 116 (e.g., a single released by the artist, an album released by the artist, a concert scheduled or held by the artist, a public appearance by the artist, a collaboration by the artist with one or more other artists, and other information describing actions performed by an artist associated with the artist profile 136.

In some implementations, the artist platform 124 is configured to update profile data 138 for an artist profile 136 automatically (e.g., independent of user input to a user interface instrumentality of the artist platform 124) based on information collected by the artist platform 124. For instance, the artist platform 124 is configured to automatically scrape data from one or more sources (e.g., from the other service provider system 112 via the network(s) 118) describing activities performed by, or information associated with, the artists 116. For instance, the artist platform 124 monitors one or more ticketing services to automatically identify ticket sales for an artist's concert or public performance and updates the profile data 138 to include information describing ticket sales. As another example, the artist platform 124 monitors one or more merchandise sales platforms and updates the profile data 138 to include information describing past merchandise sales associated with an artist. As yet another example, the artist platform 124 monitors one or more news services and updates the profile data 138 to reflect press releases, news articles, social media comments, and/or other mentions of an artist in publications.

The profile data 138 is thus representative of information that identifies a respective artist of the population of artists 116 at the media content service provider system 102 and includes information describing characteristics of the artist and actions attributed to the artist. The profile data 138 for an artist, for instance, includes information such as an artist name, a title, a genre, a style, a description, a biography, one or more images, one or more videos, sample media content (e.g., music), a status associated with the artist, combinations thereof, and so forth. Alternatively or additionally, the profile data 138 for an artist includes information describing characteristics attributable to one or more items of media content 126 associated with (e.g., created by) the artist. For instance, in the context of the media content 126 representing audio content such as a song or an album, the profile data 138 for the artist includes information describing audible characteristics of the media content 126, such as vocals, melody, hook, rhythm, harmony, beat, timbre, dynamics, texture, equipment and instrumentation (e.g., guitar, drums, flute, violin, compressed air machine, laser machine, DJ controller type or functional capabilities, preferred mixing software, audio equipment etc.), a profile theme (e.g., colors), visual data (e.g., music album cover art), combinations thereof, and so forth.

In some implementations, the profile data 138 for the artist granularly defines characteristics of a media content 126 item associated with the artist. As a specific example, the profile data 138 defines with specificity characteristics that describe vocals included in an opening 15 seconds of a song, a hook that repeats multiple times during the song, a beat that occurs during a certain three-second playback portion of the song, and so forth. In this manner, the profile data 138 for an artist is configurable to describe not only general information attributable to an artist, but also granular characteristics (e.g., characteristics that are audibly and/or visually perceived by the audience 106) of a particular instance of media content 126 created by the artist, which may not be present in other instances of media content 126 created by the artist. As such, the described examples of information included in profile data 138 are exemplary and not limiting, and the profile data 138 is representative of any information attributable to an artist in the population of artists 116.

In implementations, the profile data 138 is specified by a respective artist of the population of artists 116. For instance, the profile data 138 is provided to the media content service provider system 102 by a manager, band member, or other artist-authorized agent having access with edit permissions to the artist profile 136 for an artist on the media content service provider system 102. As an example, the profile data 138 is provided to the media content service provider system 102 as part of setting up the artist profile or as part of modifying the artist profile 136 after setup. Alternatively or additionally, the profile data 138 is provided to the media content service provider system 102 as being associated with media content 126 by a source from which the media content 126 is received.

For instance, the media content service provider system 102 receives media content 126 from the other service provider system 112, together with profile data 138 describing an artist associated with the media content 126. As a specific example, media content 126 represents a song, an album of multiple songs, or a discography of multiple albums for an artist and is received by the media content service provider system 102 from a music label (i.e., a "label") associated with the artist. In this specific example, the label provides the media content 126 to the media content service provider system 102 along with information describing the artist, such as profile data 138.

Alternatively or additionally, the profile data 138 is attributed to a respective artist of the population of artists 116 automatically by the media content service provider system 102. Examples of the profile data 138 attributed to the artist profile 136 by the media content service provider system 102 (or other sources) include, but are not limited to, a status of the artist (e.g., as a "famous" person or unlocked based on various performance measures), awards won by the artist, and so on. In one or more implementations, the media content service provider system 102 automatically determines and populates the profile data 138 with information describing one or more of artist name(s), title, genre, style, description, biography, images, videos, sample media content (e.g., music), status, profile theme (e.g., colors), characteristics (e.g., media content excerpts exhibiting signature vocals, melodies, hooks, instruments, rhythms, harmonies, beats, timbres, dynamics, textures, or other aspects that can be and so forth. In such implementations, the media content service provider system 102 is configured to determine such information automatically (e.g., by scraping data from service provider system 112 and/or another source of information about the artist), populate an initial profile with the information, and enable a user to provide user input (e.g., via computing device 110) to update at least some of the profile data 138.

In addition to profile data 138, the artist profile is depicted as including information describing audience data 140 for an artist. The audience data 140 is representative of information describing one or more users 104 (e.g., information describing at least one aspect of the one or more users 104) that consume media content 126 associated with the artist profile 136. As described herein, users that consume the media content 126 associated with an artist profile 136 represent an audience 106 of a respective artist, or entity representing multiple artists, as identified by the artist profile 136. For instance, in an example scenario where the media content 126 is representative of music, audience data 140 is representative of "listener data" for an entity (e.g., one or more of the users 104) that listen to the music.

In one or more implementations, the audience data 140 is representative of a social graph that includes nodes representing users 104 (e.g., nodes that represent individual artists of the population of artists 116 and nodes that represent individual "listeners" of the audience 106). In implementations where the audience data 140 represents a social graph, the social graph includes edges that connect the nodes representing users of the audience 106 to nodes that represent users of the artists 116 (e.g., by establishing a node between a listener and an artist when the listener consumes media content 126 affiliated with the artist). Alternatively or additionally, the social graph of the audience data 140 includes edges that connect users of the audience 106 with individual ones of the population of artists 116 representing one or more digital interactions between an audience member and an artist.

In some implementations, edges of a social graph included in the audience data 140 are weighted to further describe a relationship between an artist and a user of the audience 106 for the artist. For instance, edges are weighted based on media content consumption metrics such as a number of times an item of media content 126 is consumed by a user 104, an amount of consumption, a quantity of digital interactions (e.g., follows likes, comments, or shares via one or more social media platforms or applications), a quantity of events (e.g., performances, public appearances, etc.) attended or viewed by a user 104, merchandise purchased by a user 104, and so forth. As such, the audience data 140 is representative of a social graph where a node representing a listener (e.g., of music) is connected to numerous nodes that represent different musical artists listened to by the listener. In a similar manner, a node representing a musical artist is connected to numerous nodes that represent different users who have listened to the musical artist's media content 126 or otherwise digitally interacted with the musical artist.

In some implementations, edges connecting a node representing one of the artists 116 and a node representing a user 104 in the audience 106 specify a relationship between the user and the artist as being "active" or "passive." As described herein, an "active" edge corresponds to a member of the audience 106 that affirmatively sought out a media content 126 item associated with the artist for consumption via the media content service provider system 102 (e.g., searched for the media content item, searched for the artist, etc.). Alternatively, a "passive" edge corresponds to a member of the audience 106 that did not affirmatively seek out the media content 126 or the artist associated with the media content 126. For instance, a passive edge is created when a member of the audience 106 consumes a media content 126 item (e.g., listens to a song) associated with the artist by playing a playlist generated by the media content service provider system 102 that includes the media content 126 associated with the artist but was not selected or curated for inclusion in the playlist by the user 104 connected to the artist by the passive edge. In this manner, the audience data 140 includes information describing both individual users 104 of the audience 106 that consume a media content 126 item, as well as a manner in which the individual users 104 consumed the media content 126 item.

In some implementations, the audience data 140 includes information describing demographics of the audience 106 that consumes media content 126 affiliated with the artist profile 136. Example demographics include, and are not limited to, age, location (e.g., current, residence, birth, etc.), annual income, purchase history, specified preferences (e.g., for music genres), determined preferences (e.g., based on monitoring actual listening behavior), social media behavior, gender, sexual orientation, combinations thereof, and so forth. Alternatively or additionally, the audience data 140 describes consumption metrics for media content 126 associated with an artist profile 136. For instance, in some implementations audience data 140 describes a number of times an item of media content 126 is consumed (e.g., viewed or listened to) by an individual user 104 of the audience 106, by the entire audience 106, or by at least one segment of the audience 106.

In some implementations, consumption metrics described by the audience data 140 are constrained to a period of time, such as all-time metrics or metrics for the past year, the past month, the past week, yesterday, today, and so forth. Other examples of consumption metrics described by the audience data 140 include a frequency at which an item of media content 126 is consumed (e.g., per user, per segment of the audience 106, per the entire audience 106), changes to historical consumption metrics over time for one or more items of media content 126, a relative popularity of the artist among at least one segment of the audience 106, combinations thereof, and so forth.

The audience data 140 is further representative of collaboration information for an artist profile 136, which includes data describing past collaborations between an artist or entity represented by the artist profile 136 and at least one other artist profile included in the artist data 128. Collaboration information is represented, for instance, based on credits (e.g., as specified in metadata) associated with a media content 126 item describing collaboration by two or more entities to create the media content 126 item.

In some implementations, in order for one or more of the users 104 to become designated as one or more of the artists 116 with the media content service provider system 102, the user onboards or "registers" with the media content service provider system 102. Registration for becoming an artist of the population of artists 116, for instance, involves one or more of the users 104 providing registration data to the media content service provider system 102. In some implementations, the registration data is representative of information describing profile data 138 to be included in an artist profile 136 for the artist on the media content service provider system 102. The media content service provider system 102 is configured to limit which of the users 104 are qualified for designation as one or more artists of the population of artists 116 based at least in part on artist registration data. For example, the media content service provider system 102 is configured to permit or deny one or more of the users 104 permission to access artist data 128 for an artist via the artist platform 124.

In some implementations, the media content service provider system 102 includes an access control system (not depicted) to assist in user identity verification. For instance, an access control system of the media content service provider system 102 is useable to confirm that a user 104 attempting to access artist data 128 from the artist platform 124 is both who the user 104 purports to be, as well as confirm that the user is authorized by an artist associated with the artist profile 136 to access the artist data 128. Verifying an identity of a user 104 is performable in a variety of manners, such as using login data that includes verifiable credentials assigned to an artist identified by the artist profile 136 or verifiable credentials assigned to one or more authorized agents associated with the artist profile 136. Alternatively or additionally, verifying an identity of a user 104 is performed using identifiable information in the form of social media accounts, email addresses, biometric information, and other personally identifying data. In implementations where the login data, or other request to access information included in an artist profile 136 of the artist data 128, is verified by the media content service provider system 102, the media content service provider system 102 grants access to view, update, and/or export an authorized subset of the artist data 128.

In the context of authorizing one or more of the users 104 to access the artist platform 124 as one of the artists 116, the media content service provider system 102 is configured to allow one or more of the users 104 to be designated as an artist 116 conditioned on one or more acceptance criteria, such as based on artist permissions to be included in the artist platform 124 and for one or more items of media content 126 to be provided via the audience platform 120. Other examples of acceptance criteria involved in designating an artist 116 in the artist platform 124 include, without limitation, criteria based on evaluating one or more samples of media content 126 associated with the user(s), based on confirmation by a music label or copyright owner of the media content 126 associated with the user(s), and so forth. The media content service provider system 102 is further configured to condition verification of one or more authorized agents based on acceptance criteria, such as based on confirmation by a public relations firm that a publicist is who they purport to be and an authorized representative of an artist associated with an artist profile 136.

In some cases, verification of an authorized agent may utilize a verifiable credential system (e.g., as part of a decentralized network), in which the media content service provider system 102 is a credential verifier, the artist is an issuer of the verified credential, and the authorized agent(s) are the holders of credentials. An authorized agent presents a verified credential issued by the artist that identifies a role of the authorized agent (e.g., publicist) to the media content service provider system 102. Upon receipt of the verified credential, the media content service provider system 102 may generate access controls based on the role indicated in the verifiable credential by the artist for the authorized agent (e.g., without additional user intervention).

In implementations, the media content service provider system 102 is configured to grant one or more users 104 that meet criteria for becoming an artist 116, or an authorized agent of an artist 116, permission to access at least a portion of functionality provided by the artist platform 124. For instance, in some implementations lesser-known artists and their authorized agents are granted permission to access a subset of the total functionalities of the artist platform 124, while well-known artists and their authorized agents are granted permission to access all of the total functionalities or a subset with more of the total functionalities. Alternatively or additionally, some functionality of the artist platform 124 is withheld from an artist 116 and their authorized agents until the artist satisfies one or more threshold criteria to unlock a larger number of functionalities of the artist platform 124.

The locking and unlocking of functionalities translates into making parts of those functionalities visible or invisible (or visible but with a locked status and indicating specific steps that the artist needs to take to unlock) via a graphical user interface of the media content service provider system 102, such as graphical user interface functionalities described in further detail below. For instance, certain artists may be restricted from accessing functionality of the media content service provider system 102 to indicate whether media content 126 provided via the audience platform 120 is correctly attributed to an artist profile 136 for an artist 116. In some implementations, an artist is permitted to provide specific data, such as identity verification data, concert date and/or ticket information, performance videos, and so on, to unlock functionality or access to the artist platform 124.

In implementations where the media content service provider system 102 identifies that a user purporting to be one of the artists 116 is not "who they say they are," the media content service provider system 102 is configured to deny the user designation as an artist, deny the user designation as an authorized agent for an artist, deny the user access to artist data 128 associated with an artist, or combinations thereof. In some implementations, the media content service provider system 102 is configured to notify a person or entity represented by one of the artists 116 that an imposter is attempting to register as the artist on the media content service provider system 102 and/or access artist data 128 associated with the artist on the media content service provider system 102. The media content service provider system 102 is thus configured to advantageously prevent fraud, intellectual property infringement (or theft), security vulnerabilities, and the like, which might result from incorrectly registering a user as an artist 116 or an authorized agent of an artist. The media content service provider system 102 is configured to provide such notification in a variety of manners, such as via email, phone, social media messaging, text, and so forth.

In implementations where the media content service provider system 102 determines that a user is who they purport to be and that the user is authorized to access artist data 128 for one or more of the artists 116, the media content service provider system 102 grants access to view the artist data 128. For instance, in response to receiving login data as part of a request to access artist data 128, the media content service provider system 102 verifies that user credentials included in the login data identify an artist 116 or an authorized agent of the artist identified by the artist data 128. In response to verifying that the login data is received from a user authorized by an artist to access the artist's artist data 128, the media content service provider system 102 grants access to the artist data 128. In some implementations, granting access to the artist data 128 includes outputting a display of a portion or entirety of the artist data 128 via a user interface of the media content service provider system 102. Alternatively or additionally, granting access to the artist data 128 includes exporting a portion or entirety of the artist data 128 to a third-party platform, such as to the other service provider system 112.

In some implementations, granting access to the artist data 128 includes outputting information describing a subset of the audience 106 that qualify as engaged users 142 for the artist 116. The engagement engine 134 of the recommendation system 130, for instance, is configured to identify a subset of the audience 106 that represent "engaged fans" for an artist 116, based on various combinations of data points and/or input signals and respective threshold values for individual data points, and define the subset of the audience 106 as engaged users 142 for the artist. Data points and input signals considered by the engagement engine 134 in identifying engaged users 142 for an artist associated with an artist profile 136 may be monitored by account activity of individual users 104 on the media content service provider system 102, by one or more third-party platforms (e.g., by the other service provider system 112), or combinations thereof.

In one or more implementations, the engagement engine 134 identifies engaged users 142 for an artist based on a volume of streams, by a user 104, of one or more items of media content 126 that are associated with the artist profile 136. The volume of streams of one or more items of media content 126 associated with an artist profile 136 is compared against one or more threshold criteria, such as a minimum number of consumption instances (e.g., playbacks, streams, etc.), a minimum percentage of streams of media content 126 items associated with the artist profile 136, relative to a total number of streams of media content 126 items by the user 104, combinations thereof, and so forth. In this manner, the engagement engine 134 is configured to identify a subset of the audience 106 that qualify as engaged users 142 for an artist based on one or more measures of time and/or attention a user 104 exhibits as dedicating to the artist's work (e.g., as evidenced by streams or other forms of consuming items of media content 126 associated with the artist).

In some implementations, the engagement engine 134 identifies engaged users 142 for an artist as members of the audience 106 that have consumed a threshold percentage of all media content 126 items associated with an artist on the media content service provider system 102. For instance, the engagement engine 134 is configured to exclude members of the audience 106 from being engaged users 142 for an artist unless input signals indicate that a user 104 of the audience 106 has consumed at least a threshold amount (e.g., 85%) of media content 126 items associated with the artist.

In some implementations, a manner in which a user 104 of the audience 106 consumes media content 126 associated with the artist is weighted by the engagement engine 134 when determining whether the user 104 qualifies as a member of the engaged users 142 for the artist. For instance, in some implementations the engagement engine 134 is configured to identify, based on input signals, how the user 104 navigated to the media content 126 associated with the artist via the media content service provider system 102. As a specific example, in some implementations consumption of the media content 126 may be weighted in more favor of assigning the user 104 to the engaged users 142 in response to the user 104 exhibiting behavior of seeking out the artist on the media content service provider system 102 (e.g., by navigating to an artist's dedicated page on the media content service provider system 102), in response to a search for the artist, by consuming media content 126 of artists that are similar to the artist, by saving media content 126 (e.g., adding to a playlist or a personal library), by sharing the artist's media content 126 with other users 104, and so forth.

Continuing the example above noting how relationships between artist 116 and user 104 are configured as a weighted graph, "active" edges between the user and the artist may be weighted by the engagement engine 134 in favor of assigning the user as one of the engaged users 142. Alternatively, consumption of the media content 126 may be weighted less in favor of assigning the user to the engaged users 142 if edges in the weighted graph are "passive" (e.g., if the user's consumption of the artist's media content 126 was performed in response to the media content service provider system 102 recommending that the user consume the media content 126).

Alternatively or additionally, the engagement engine 134 identifies engaged users 142 for an artist based on input signals indicating whether a user of the audience 106 is engaged with the artist via one or more social media platforms. As a specific example, in some implementations the service provider system 112 represents a service provider offering one or more social media platforms that enables interaction between profiles corresponding to different ones of the users 104 and the media content service provider system 102 receives an indication as to whether an individual member of the audience 106 follows, messages, shares the artist with others, or otherwise engages with the artist via the social media platform. In this manner, the engagement engine 134 is configured to identify a subset of the audience 106 that qualify as engaged users 142 for an artist based on one or more measures of time and/or attention a user 104 exhibits as dedicating to the artist via voluntary affiliation with the artist via one or more social media accounts.

Alternatively or additionally, the engagement engine 134 identifies engaged users 142 for an artist based on input signals indicating whether a user of the audience 106 attends live events by the artist, such as concerts, public appearances, online events, and so forth. Attendance by a user of live events by the artist may be an input signal interpreted by the engagement engine 134 as biasing the user towards inclusion in the engaged users 142 for the artist. Conversely, an absence of input signals indicating that a user attends live events by the artist may cause the engagement engine 134 to exclude the user from the engaged users for the artist. In some implementations, the engagement engine 134 is configured to factor in data points representative of a practicality by which a user 104 is able to attend a live event by an artist. For instance, if an artist is based in Los Angeles and frequently conducts live events in the Los Angeles area, the engagement engine 134 is configured to identify that a user 104 located in Norway who does not attend the artists' live events is included in the engaged users 142 in favor of another user located in Los Angeles who similarly does not attend the artists' live events.

In some implementations, the engagement engine 134 is configured to disregard live event input signals when determining which members of the audience 106 are included in the engaged users 142 for an artist. For instance, in one implementation the engagement engine 134 is configured to disregard data points indicating attendance or lack of attendance at a live event for users having associated location data indicating that the user was not within a threshold geographical distance of the live event. As a specific example, if location data for a user's mobile computing device while accessing the media content service provider system 102 during the live event indicates that the user was outside a threshold radius of the live event, the engagement engine 134 selectively disregards factoring the live event data points into a determination of whether the user is included in the engaged users 142 for the artist. In a similar manner, the engagement engine 134 is configured to identify when a user has traveled over a threshold distance to attend a live event and weight data points indicating such a threshold travel distance in greater favor of including the user in the engaged users 142 for the artist. Example live event thresholds and weights by which the engagement engine 134 factors in such data points into assigning members of the audience 106 to the engaged users 142 is configurable in any manner and is not intended to be limited by the specific examples described herein.

Alternatively or additionally, the engagement engine 134 identifies engaged users 142 for an artist based on input signals indicating whether the user has exhibited a financial investment in the artist. For example input signals indicating that a user financially invests in the artist include purchasing items of media content 126 associated with the artist (e.g., buying originals or copies of artwork, purchasing albums, purchasing merchandise, purchasing tickets for live events, supporting the artist via one or more crowdfunding initiatives via the media content service provider system 102 the service provider system 112, combinations thereof, and so forth). The engagement engine 134 is configured to weigh input signals that indicate a financial commitment to, or investment in, the artist as favoring inclusion of the associated user in the engaged users 142. Conversely, the engagement engine 134 is configured to weigh input signals that indicate no financial commitment to, or investment in, the artist as favoring exclusion of the associated user from the engaged users 142. In this manner, the engagement engine 134 is configured to identify a subset of the audience 106 that qualify as engaged users 142 for an artist based on one or more measures of financial commitments that a user 104 exhibits as contributing towards the artist, and thus accounts for economic indicators of engagement.

Alternatively or additionally, the engagement engine 134 identifies engaged users 142 for an artist based on input signals describing information other than a user's interaction or engagement with the artist. For instance, in some implementations the engagement engine 134 is configured to select individual users of the audience 106 that have engaged with other artists before the artists have become famous (e.g., before the other artist has achieved a threshold number of instances of users 104 consuming their media content 126 on the media content service provider system 102 and/or another service provider system 112, before the other artist has a threshold number of different users of the audience 106 consuming their media content 126 on the media content service provider system 102 and/or another service provider system 112, combinations thereof, and so forth).

In this manner, the engagement engine 134 is configured to select, for inclusion in the engaged users 142 for an artist, users whose input is likely valuable in identifying how artists 116 might create media content 126 in a manner that is well received by a large segment of the audience 106. As another example of input signals describing information other than a user's interaction or engagement with the artist, the engagement engine 134 may select a user 104 for inclusion in the engaged users 142 for an artist in response to detecting that the user 104 has previously recommended a collaboration between two or more of the artists 116 that has been successful (e.g., has been consumed via the media content service provider system 102 a threshold number of times, has been consumed by a threshold number of different members of the audience 106, combinations thereof, and so forth).

In some implementations, the engagement engine 134 is configured to weight input signals and data points considered in identifying a subset of the audience 106 that qualifies as engaged users 142 for an artist based on a source from which the input signals and data points are received. For instance, in some implementations the engagement engine 134 is configured to assign a greater weight to an input signal or data point (e.g., cause the input signal or data point to have a greater influence on a resulting determination of whether a user is included in the subset of engaged users 142 for an artist) in response to the input signal or data point being gleaned from the media content service provider system 102. Conversely, the engagement engine 134 is configured to assign a lesser weight to a similar input signal or data point (e.g., cause the input signal or data point to have a lesser influence on a resulting determination of whether a user is included in the subset of engaged users 142 for an artist) in response to the input signal or data point being gleaned from a source other than the media content service provider system 102 (e.g., from the other service provider system 112).

Weighting data points and input signals is alternatively or additionally performed resulting from having verified users via registered accounts with the media content service provider system 102, via a verifiable credential issued by a trusted third-party issuer, via a proof-of-human test, combinations thereof, and so forth. In this manner, the engagement engine 134 is configured to adapt a manner by which different input signals and data points influence which users 104 are assigned to the engaged users 142 subset for an artist, based on a relative level of trust associated with a source of the input signals and data points.

The engagement engine 134 is thus configured to use any one or combination of input signals and/or data points to identify a subset of the audience 106 that qualifies as engaged users 142 for an artist by comparing each data point and/or input signal to one or more threshold values. Although specific example thresholds are mentioned herein for contextual purposes, the examples are not intended to be limiting and the engagement engine 134 is configured to output a group of engaged users 142 for an artist using any combination of input signals, data points, and respective associated threshold values. In some implementations, specific threshold values for various data points involved in identifying a set of engaged users 142 are defined by an artist or an authorized agent of the artist. Alternatively or additionally, threshold values for data points or input signals involved in identifying a set of engaged users 142 are automatically selected or recommended by the recommendation system 130 (e.g., based on parameters learned by the engagement engine 134 during training, based on human-defined preset thresholds, based on past recommendations generated by sets of engaged users 142 for one or more different artists, based on evaluations of whether recommendations generated by engaged users 142 for different artists were successful, combinations thereof, and so forth). In various examples, the engagement engine 134 may attribute different weights to different artists 116 for different signals, thus allowing customization of engagement thresholds to suit a context associated with an individual artist and/or the fans of an individual artist.

In response to the engagement engine 134 generating a set of engaged users 142 for an artist, the recommendation system 130 is configured to output a collaboration interface 144 for display at a computing device 110 associated with one or more users included in the engaged users 142 for the artist. In implementations, the collaboration interface 144 includes a prompt for feedback from a user (e.g., from a corresponding one of the engaged users 142) regarding how the artist identified by the artist profile 136 is recommended to collaborate with one or more different artists to generate media content 126. In some implementations, the recommendation system 130 is configured to output the collaboration interface 144 to a computing device 110 associated with one of the engaged users 142 in response to identifying that the engaged user is currently interacting with the artist (e.g., is viewing a page on the media content service provider system 102 dedicated to the artist, is consuming an item of media content 126 associated with the artist, and so forth).

Alternatively or additionally, the collaboration interface 144 is output to the engaged users 142 during a limited time window (e.g., a predetermined time window), such that engaged users 142 are offered a limited time to share their own thoughts and/or interact with other engaged users 142 to provide feedback regarding an artist's collaboration with other artists. In implementations, the recommendation system 130 generates the collaboration interface to include one or more controls that are selectable to provide feedback regarding a future collaboration by the artist of artist profile 136 with at least one different artist. A further description of example configurations of the collaboration interface 144 (e.g., controls and functionality included in the collaboration interface 144, along with manners in which the collaboration interface 144 is output at the computing device 110), is described in further detail below with respect to the illustrated examples of FIGS. 3-7.

Input to the collaboration interface 144 (e.g., user input to the collaboration interface 144 via the computing device 110) is returned to the recommendation system 130 as collaboration feedback 146, as depicted in the illustrated example of FIG. 1. The collaboration feedback 146 is representative of data describing any input to, or interaction with, the collaboration interface 144, such as textual input, audio (e.g., voice, instrumental, digitally-generated audio, etc.) input, image (e.g., video, picture, etc.) input, an indication of whether a certain portion of the collaboration interface 144 was viewed, information describing a duration with which one or more aspects of the collaboration interface 144 are displayed at the computing device 110, combinations thereof, and so forth. In this manner, the collaboration feedback 146 is generally representative of feedback provided by a member of the audience 106 that qualifies as an "engaged fan" for an artist (e.g., by virtue of being assigned to the engaged users 142 for the artist identified by the artist profile 136) regarding an identity of at least one different artist with which the engaged fan recommends that artist collaborate, a specific manner in which the engaged fan recommends that the artist collaborate with at least one different artist, combinations thereof, and so forth.

Based on collaboration feedback 146 received from engaged users 142 for an artist via the collaboration interface 144, the recommendation system 130 is configured to generate a collaboration recommendation 148 for the artist. After the recommendation system 130 generates the collaboration recommendation 148 for an artist, the media content service provider system 102 is configured to present the collaboration recommendation 148 to the artist. In some implementations, presenting the collaboration recommendation 148 is performed as part of granting access to the artist data 128 and is displayed in a recommendation interface 150 provided by the media content service provider system 102. The recommendation interface 150, for instance, is output for display at a computing device 110 from which verified login data for an artist is received.

In addition to including a display of information describing at least one different artist that the engaged users 142 recommend for a future collaboration (e.g., at least one different artist the engaged user recommends the artist to partner with to create media content 126), in some implementations the recommendation interface 150 includes one or more controls that are selectable to initiate performance of a recommended action. As an example, in response to a threshold number of the engaged users 142 recommending that the artist to whom recommendation interface 150 is being presented collaborate with a specified "collaboration artist," the recommendation interface 150 outputs a recommendation to initiate communications with the specified collaboration artist.

In this example, the recommendation interface 150 outputs the collaboration recommendation 148 with at least one control that is selectable to establish a communication channel with the specified collaboration artist. Alternatively or additionally, the recommendation interface 150 includes at least one control that is selectable to communicate with one or more members of the engaged users 142 (e.g., issue a communication thanking engaged fans for the collaboration recommendation 148, providing early access to media content 126 created as a result of a recommended collaboration), issue press release or advertisement notifying the audience 106 of a upcoming collaboration, and so forth. By providing such a control via the recommendation interface 150, the recommendation system 130 confines communications to a centralized communication channel, rather than leveraging multiple communication channels across different platforms like conventional approaches. This conserves communication resources and bandwidth that would be consumed if the one or more communication channels were established in a non-centralized manner.

In some implementations, the recommendation system 130 adjusts the collaboration recommendation 148 presented in the recommendation interface 150 based on a role associated with a user from whom login data (e.g., for accessing the media content service provider system 102) is received. For instance, in a scenario where the media content service provider system 102 identifies that an artist is accessing their own artist data 128, the recommendation interface 150 is generated to output an unfiltered version of the collaboration recommendation 148 (e.g., provide the artist with information describing any or multiple recommendations generated by the recommendation system 130, provide the artist with a summary or complete description of the collaboration feedback 146 from which the collaboration recommendation 148 was generated, and so forth). In other words, in one or more implementations, an artist may be associated with permissions that enable the artist to be shown more information in the recommendation interface 150 than other users, e.g., engaged users, are shown.

Alternatively, in a scenario where the login data indicates that the recommendation interface 150 is being viewed by an authorized agent associated with an artist, the recommendation system 130 is configured to tailor information included in the recommendation interface 150 based on a role assigned to the authorized agent, a permission level granted by the artist to the authorized agent, combinations thereof, and so forth. As a specific example, in a scenario where the collaboration recommendation 148 is for an artist to go on tour with a different artist and the media content service provider system 102 identifies that an authorizes tour manager is viewing the recommendation interface 150, the recommendation system 130 modifies the recommendation interface 150 to display recommended tour stops for the subject artists (e.g., based on audience data 140 indicating geographic concentrations of fans for the subject artists, based on past performance data describing historic performances by the subject artists and/or similar artists, and so forth). To do so, the recommendation system 130 is configured to leverage information maintained in the artist platform 124 that defines different categories of similar artists.

For instance, the artist platform 124 is configured to assign individual artists 116 to an artist segment, where an artist segment represents a category that groups similar artists based on one or more criteria. For instance, in one example scenario the artist platform 124 groups artists into an "Unknown" artist segment, a "Rising" artist segment, an "Established" artist segment, or an "Icon" artist segment. Example criteria for grouping artists into different segments include a threshold number of streams of media content 126 items associated with the artist, such that artists with fewer than 10,000 streams are assigned to the "Unknown" artist segment and artists with 10,000-500,000 overall streams are assigned to the "Rising" artist segment. Continuing this example scenario, artists with more than 5,000,000 streams are assigned to the "Icon" artist segment, and artists with 500,000 to 5,000,000 streams are assigned to the "Established" artist segment. The artist platform 124 is configured to group artists 116 by artist segments based on any suitable criteria or combination of criteria, and a granularity with which artists are assigned to different artist segments is not limited to the four example segments described above. In examples, additional and/or different criteria may be used to group artists into segments, such as location, genre, revenue, collaborations, social media following, tour frequency and/or location, event ticket sales, merchandise sales, and so forth.

By grouping similar artists by artist segment, the recommendation system 130 is configured to leverage artist data 128 associated with different artists when outputting a recommendation via the recommendation interface 150. In this manner, the recommendation system 130 is configured to leverage additional information beyond input provided by the engaged users 142 for an artist (e.g., via the collaboration feedback 146). For instance, if the collaboration feedback 146 provided by engaged users 142 is for two artists to collaborate and create media content 126, the recommendation system 130 is configured to identify artist data 128 for different artists who share one or more similar characteristics with the two artists identified in the collaboration feedback 146 and use this similar artist data when generating the collaboration recommendation 148.

As a specific example, if the recommendation is being generated for an artist currently assigned to an "Unknown" artist segment, the recommendation system 130 selects artist data 128 for artists that were previously in the "Unknown" artist segment and have risen to the "Rising" artist segment, such that the recommendation is generated based on data that describes how others achieved an increase in consumption of their media content 126 item(s). As a specific scenario, if the collaboration feedback 146 is for two artists assigned to a "Unknown" artist segment to collaborate and create music in a "Country" genre, the recommendation system 130 is configured to identify artist data 128 for other artists that were previously assigned to the "Unknown" artist segment and exhibited success in collaborating in the "Country" music genre. Such similar artist data 128 may indicate, for instance, concert tour routes that resulted in additional consumption instances of media content 126, merchandise sales from past collaborations that performed well, publication and/or announcements made by the similar artists to inform the audience 106 of the collaboration, and so forth.

In this manner, the collaboration feedback 146, and optionally artist data 128, is provided as input to the model(s) 132 of the recommendation system 130 for use in generating a collaboration recommendation 148 to be presented in the recommendation interface 150. In implementations, the recommendation system 130 is configured to automatically (e.g., independent of user intervention after generation of the collaboration feedback 146 via the collaboration interface 144) generate a recommendation using the one or more model(s) 132. The model(s) 132 are thus representative of one or more machine learning models trained to output a recommendation to perform an action that is predicted to provide a positive collaboration result for an artist viewing the recommendation interface 150 (e.g., an increased consumption of a media content 126 item created by the artist collaborating with at least one different artist).

In implementations, the one or more model(s) 132 are trained to output a collaboration recommendation 148 for an artist 116 or an artist's authorized agent using ground truth training data. Ground truth data as described herein refers to one or more training pairs that each include a vector representation of a collaboration recommendation 148 and an observed result (e.g., a known result) for an artist 116 taking one or more actions recommended by the collaboration recommendation 148 (e.g., based on the collaboration feedback 146). The vector representation included in a training pair is representative of data that describes any one or more subsets, or entirety, of information included in collaboration feedback 146 and an observed result such as consumption metrics for media content 126 generated as a result of a collaboration recommended in the collaboration feedback 146, ticket sales, merchandise revenue, combinations thereof, and so forth. The models 132 leveraged by the recommendation system 130, for instance, are trained using ground truth data describing historic collaboration feedback 146 provided for an artist by the artist's engaged users 142, along with information describing an observed result of taking one or more actions included in a collaboration recommendation 148 generated based on the collaboration feedback 146.

In some implementations, the one or more model(s) 132 are trained using negative training pairs, which each include a vector representation of a collaboration recommendation 148 and an observed result that describes a negative outcome for an artist 116 taking one or more actions recommended by the collaboration recommendation 148 (e.g., based on the collaboration feedback 146). The ground truth training pairs and the negative training pairs are thus useable by the recommendation system 130 to train the one or more model(s) 132 to output a collaboration recommendation 148 that suggests performance of an action predicted to have a positive result for an artist 116. Although described herein in the context of being separate sets of training pairs, in some implementations the ground truth data includes both positive training pairs (e.g., training pairs that include a vector representation of a collaboration recommendation 148 and a known positive result observed for the vector representation of the collaboration recommendation 148) and negative training pairs.

In some implementations, the one or more model(s) 132 are representative of one or more generative artificial intelligence models, such as generative adversarial network (GAN) models. Other example machine-learning mechanisms represented by the model(s) 132 include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, and so forth.

Descriptions of the recommendation system 130 outputting a collaboration interface 144, of generating a collaboration recommendation 148 based on collaboration feedback 146 from the collaboration interface 144, and presenting the collaboration recommendation 148 in a recommendation interface 150, are provided in further detail below.

Figure 2:
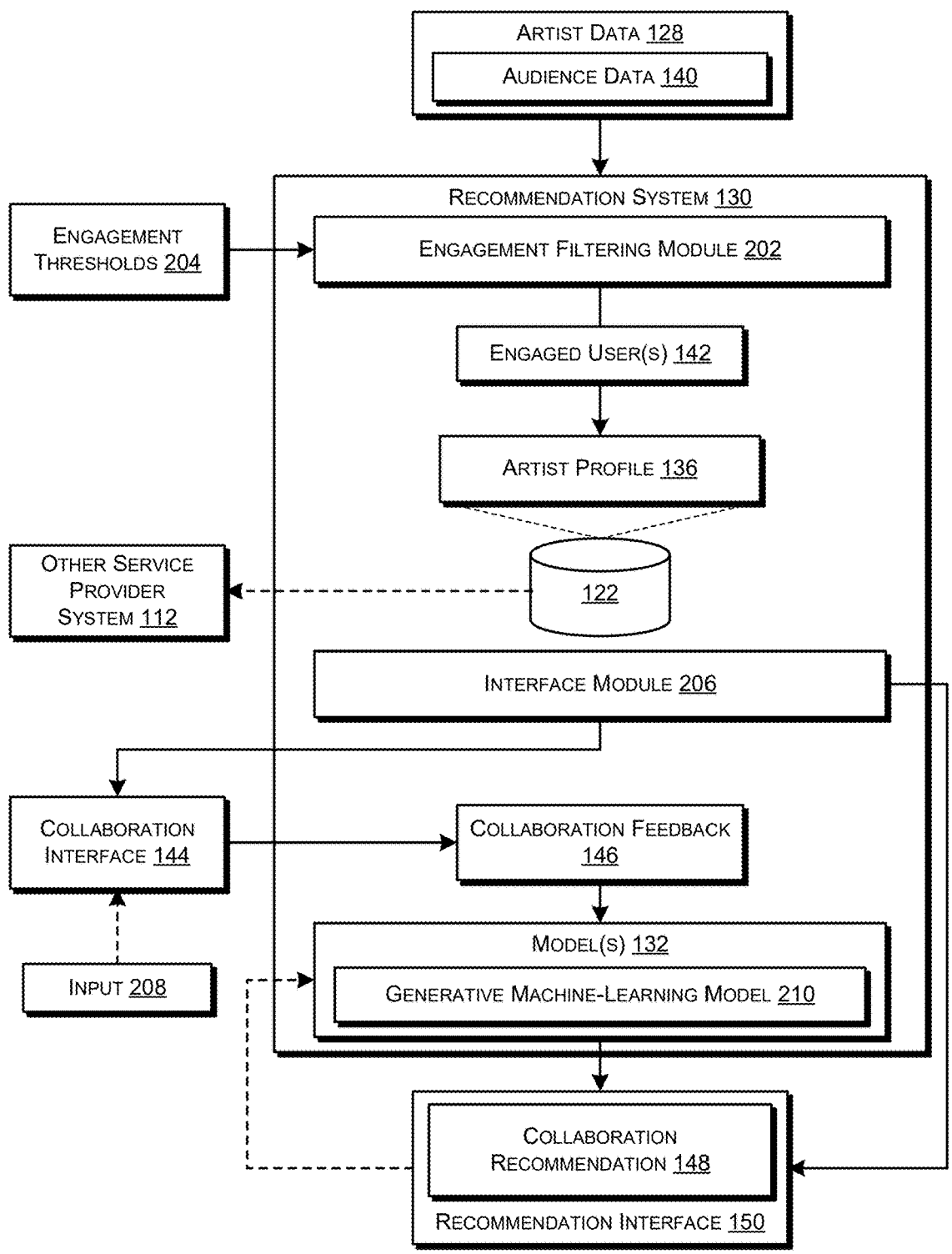
FIG. 2 is a non-limiting example of a recommendation system that outputs a collaboration interface to engaged users for an artist, receives feedback via input to the collaboration interface, generates a collaboration recommendation for the artist based on the received feedback, and outputs the collaboration recommendation in a recommendation interface for an artist in accordance with one or more implementations described herein.

FIG. 2 is a non-limiting example of a recommendation system that outputs a collaboration interface to engaged users for an artist, receives feedback via input to the collaboration interface, generates a collaboration recommendation for the artist based on the received feedback, and outputs the collaboration recommendation in a recommendation interface for an artist.

In the illustrated example 200, the recommendation system 130 is depicted as receiving audience data 140 as part of artist data 128 for an artist 116. In implementations, the artist data 128 is received by the recommendation system 130 from various sources, such as from one or more other service provider systems 112, from storage 122, combinations thereof, and so forth. The recommendation system 130 is depicted as including an engagement filtering module 202. The engagement filtering module 202 represents functionality of the recommendation system 130 to identify the subset of the audience 106 that qualifies as engaged users 142 for the artist identified by artist data 128. In implementations, the engagement filtering module 202 is configured to identify one or more engaged users 142 for an artist based on engagement thresholds 204.

The engagement thresholds 204, as depicted in the illustrated example of FIG. 2, are representative of input to the recommendation system 130 (e.g., by the artist, by an authorized agent of the artist, etc.), of pre-defined engagement thresholds 204 specified by the recommendation system 130, or a combination thereof. In some implementations, the engagement thresholds 204 for an artist are modified over time by the recommendation system 130. For instance, in implementations where an artist progresses from an "Unknown" artist segment to an "Icon" artist segment, respective values in the engagement thresholds 204 that were suitable for the "Unknown" artist segment may not be suitable for adequately distinguishing engaged fans from the audience 106 for the "Icon" artist segment.

For instance, the recommendation system 130 is configured to identify the set of engaged users 142 for an artist based on a threshold value of an overall audience size that has consumed media content 126 associated with the artist (e.g., a maximum percentage of a number of different audience 106 members indicated in the audience data 140 as having consumed the artist's media content 126). In this manner, the recommendation system 130 is configured to adjust values represented in the engagement thresholds 204 to prevent a size of the audience 106 included in the engaged users 142 form exceeding the overall threshold value (e.g., number of users 104, percentage of different users represented in the audience data 140, and so forth) for the engaged users 142.

Specific metrics and associated values represented by the engagement thresholds 204 vary in accordance with different implementations and are configurable in any suitable manner (e.g., by the recommendation system 130, by an artist 116, etc.) in accordance with the techniques described herein. For instance, in some implementations the engagement thresholds 204 define a volume of streams of the artist's media content 126 that must be consumed by a user 104 in order for the user 104 to be included in the engaged users 142 for the artist. As a specific example, the engagement thresholds 204 specify that a threshold number of streams of media content 126 items associated with the artist must be consumed by a user 104 in order for the user 104 to be eligible for inclusion in the engaged users 142.

As another specific example, the engagement thresholds 204 specify that a user 104 must consume items of media content 126 associated with the artist a threshold amount relative to an overall amount of media content 126 items consumed by the user 104 (e.g., that the user consume the artist's media content 126 at least 50% of the time that the user consumes media content 126) for the user 104 to be eligible for inclusion in the engaged users 142. In some implementations, the recommendation system 130 is configured to weight metrics represented in the audience data 140 based on a manner in which the user 104 arrived at consuming media content 126 associated with the artist. For instance, the recommendation system 130 is configured to increase a contributory weight associated with instances of media content 126 consumption when the audience data 140 indicates that the user 104 proactively sought out an artist, and thus favor inclusion of the user 104 in the engaged users 142 for an artist.

As an example, if the audience data 140 indicates that a user 104 consumed the artist's media content 126 by searching for the artist on the media content service provider system 102, by consuming media content 126 directly from a page or group on the media content service provider system 102 associated with the artist, by adding or saving the media content 126 to a playlist associated with a user account, and so forth, the recommendation system 130 factors in such manners of consumption to favor inclusion of the user 104 in the engaged users 142. Alternatively, the recommendation system 130 is configured to decrease a contributory weight associated with instances of media content 126 consumption when the audience data 140 indicates that the user 104 did not seek out the artist, and thus favor exclusion of the user 104 from the engaged users 142 for the artist. For instance, the recommendation system 130 is configured to assign less mathematical importance to an instance of media content 126 consumption when the media content 126 was recommended by the service provider system 102 for consumption by the user 104.

Alternatively or additionally, the engagement thresholds 204 specify that a user must follow the artist on one or more social media platforms to be eligible for inclusion in artist's engaged users 142. Alternatively or additionally, the engagement thresholds 204 specify that a user must share the artist with others (e.g., with other users 104 via the media content service provider system 102, with other users via the other service provider system 112, and so forth) for the user 104 to be eligible for inclusion in the engaged users 142. In some implementations where the engagement thresholds 204 require a user to share the artist with other users, the engagement thresholds 204 further specify a minimum number of shares (e.g., a minimum number of different users with whom the user has shared the artist or media content 126 associated with the artist) for the user 104 to be eligible for inclusion in the engaged users 142.

Alternatively or additionally, the engagement thresholds 204 specify that a user 104 must have attended a threshold amount of live events associated with the artist (e.g., concerts, public appearances, online events, etc.) for the user 104 to be eligible for inclusion in the engaged users 142. Alternatively or additionally, the engagement thresholds 204 specify that a user 104 must have purchased a threshold amount of merchandise associated with the artist for the user 104 to be eligible for inclusion in the engaged users 142. For instance, the engagement thresholds 204 specify that a threshold monetary amount be spent on merchandise, tickets, or other goods and/or services associated with the artist. Alternatively or additionally, the engagement thresholds 204 specify that a user 104 must have supported the artist via the media content service provider system 102 or on at least one other service provider system 112 (e.g., by financially contributing to a crowdfunding initiative for the artist, by investing in the artist's creation of media content 126, and so forth).

Alternatively or additionally, the engagement thresholds 204 specify that a user 104 must have demonstrated familiarity with a threshold percentage of an artist's entire catalog of media content 126 available via the media content service provider system 102 for the user 104 to be eligible for inclusion in the engaged users 142. For instance, the engagement thresholds 204 specify that a user 104 must have consumed at least 80% of all media content 126 items associated with the artist to qualify as an engaged fan, and thus qualify for inclusion in the engaged users 142.

Alternatively or additionally, the engagement thresholds 204 pertain to criteria other than a user's engagement or interaction with a particular artist (e.g., an artist for whom the engaged users 142 are being identified). For instance, in some implementations the engagement thresholds 204 specify that users 104 of the media content service provider system 102 who have interacted with artists (e.g., consumed media content 126 of artists) before they were famous (e.g., while the artist was assigned to an "Unknown" segment before progressing to an "Icon" segment) are to be included in the engaged users 142, regardless of whether the user 104 has demonstrated familiarity or engagement with the subject artist.

As another example, the engagement thresholds 204 specify that a user 104 who have previously recommended successful collaborations between two or more artists to create media content 126 (e.g., recommended creation of collaboration media content 126 that exhibits a threshold number of overall consumption instances or a threshold number of consumption instances by unique users) are to be included in the engaged users 142 for an artist. In this manner, the engagement thresholds 204 are configurable to specify any suitable one or more metrics, and respective threshold value(s) for each of the one or more metrics, to filter which users 104 form the audience 106 are included in the engaged users 142 for an artist, and are not intended to be limited by the specific examples provided herein.

In some implementations, any one or more of the engagement thresholds 204 are temporally constrained, such that the engagement filtering module 202 considers only audience data 140 describing user 104 behavior within a threshold past amount of time relative to a current point in time at which the engaged users 142 are being identified. In this manner, the engagement filtering module 202 is configured to ignore stale data and ensure that users 104 included in the engaged users 142 for an artist represent actively engaged fans for the artist.

In response to identifying the engaged users 142 for an artist, the engagement filtering module 202 updates the artist profile 136 associated with the artist identified by the artist data 128 to include the engaged users 142. The updated artist profile 136, with information describing the engaged users 142 for the artist, is stored in storage 122 for subsequent use by the recommendation system 130. Alternatively or additionally, the artist profile 136 with information describing the engaged users 142 for an artist is output to a third-party storage location, such as a computing device associated with the artist 116 identified by the artist data 128, the other service provider system 112, combinations thereof, and so forth.

The recommendation system 130 is further depicted as including an interface module 206. The interface module 206 represents functionality of the recommendation system 130 to output the collaboration interface 144 to individuals included in the engaged users 142 for an artist, as well as to output a recommendation interface 150 to the artist, where the recommendation interface 150 includes a collaboration recommendation 148 generated based on feedback to the collaboration interface 144. In implementations, the recommendation system 130 is configured to first authenticate an identity of a user before permitting the interface module 206 to output a respective user interface (e.g., authenticate the identity of a user included in the engaged users 142 before outputting the collaboration interface 144 or authenticate the identity of an artist before outputting the recommendation interface 150).

Thus, the recommendation system 130 is configured to ensure that an entity viewing the collaboration interface 144 is included in the engaged users 142 for an artist, and ensure that an entity viewing the recommendation interface 150 is authorized by the artist to access the artist data 128. Entity credentials used by the recommendation system 130 to verify identity include any suitable form of verifiable information (e.g., username and password combination, two-factor authentication credentials, biometric information such as fingerprints, face recognition iris scans and so forth, physical security tokes or key fobs, combinations thereof, and so forth).

As described in further detail below, the interface module 206 is configured to generate the collaboration interface 144 to include at least one portion that generates collaboration feedback 146 and returns collaboration feedback 146 to the recommendation system 130 responsive to input 208. For instance, the interface module 206 generates the collaboration interface 144 to include one or more prompts for feedback regarding how an engaged user recommends that the artist corresponding to artist data 128 collaborate with at least one different artist to create media content 126. Controls or portions of the collaboration interface 144 configured by the interface module 206 to receive input 208 from individual users of the engaged users 142 include, but are not limited to, text boxes, checkboxes, drop-down menus (e.g., combo boxes), sliders, spin boxes (e.g., numerical stepper controls), toggle buttons (e.g., switches), date and time pickers, file input controls, combinations thereof, and so forth. As referred to herein, text boxes represent functionality of the collaboration interface 144 to receive alpha-numeric characters (e.g., comments or messages).

As referred to herein, checkboxes enable the engaged users 142 to select one or multiple options from a list. As referred to herein, drop-down menus enable the engaged users 142 to select from a predefined list of options. As referred to herein, sliders enable the engaged users 142 to select a value within a range (e.g., by moving a handle along a track). As referred to herein, spin boxes enable the engaged users 142 to make incremental adjustments to numerical values. As referred to herein, toggle buttons enable the engaged users 142 to change a setting between two states (e.g., include or exclude). As referred to herein, date and time pickers enable the engaged users 142 to specify temporally constrained data (e.g., to select or otherwise specify a certain segment of an item of media content 126 that the engaged users recommend be replicated or otherwise included in a collaboration between the artist and at least one different artist). As referred to herein, file input controls enable the engaged users 142 to provide (e.g., upload) files. For example, the engaged users 142 may be able to provide files via a "browse" button that opens a file explorer on a computing device 110 to specify a data storage address from which a file is to be uploaded, such as a user-created instance of media content 126 to suggest a collaboration effort for the artist. Thus, the interface module 206 represents functionality of the recommendation system 130 to generate a collaboration interface 144 that includes any one or combination of different controls designed to receive input 208 from the engaged users 142 regarding collaboration feedback 146 for the artist. The recommendation system 130 is configured to update the artist profile 136 with collaboration feedback 146 received via the collaboration interface.

Additionally, the recommendation system 130 is configured to generate a collaboration recommendation 148 for the artist based on the collaboration feedback 146 (e.g., by providing the collaboration feedback 146 as input to the model(s) 132). For instance, in response to detecting that collaboration feedback 146 specified by a threshold number of different engaged users 142 recommends that the artist take a certain action, the recommendation system 130 generates the collaboration recommendation 148 to recommend that the artist take the certain action. As a specific example, if a threshold number (e.g., at least 50%) of the engaged users 142 provide collaboration feedback 146 that recommends the artist collaborate with an artist named "RORO," the recommendation system 130 generates a collaboration recommendation 148 that suggests the artist collaborate with RORO to create media content 126. In some implementations, the interface module 206 is further configured to output the collaboration recommendation 148 in the recommendation interface 150 with an indication as to the underlying data that motivated generation of the collaboration recommendation 148 (e.g., a summary or an entirety of the collaboration feedback 146 received via the collaboration interface 144).

In some implementations, the recommendation system 130 generates the collaboration recommendation 148 by providing inputs specified in collaboration feedback 146 to a generative machine-learning model 210 of the model(s) 132. The generative machine-learning model 210 is configured in one or more examples according to a transformer model architecture as a generative pretrained transformer to generate an output (e.g., text, audio, video, or combinations thereof) based on an input. To do so, the generative machine-learning model 210 generates tokens to represent different aspects of the input 208 and/or the collaboration feedback 146 generated based on the input 208 (e.g., generates tokens to represent input(s) to the collaboration interface 144). The tokens are then processed in order by generating a context that includes each of the tokens in the sequence before it as part of standardizing the collaboration feedback 146 (e.g., as part of an open protocol).

Accordingly, the generative machine-learning model 210 in this example is trained and retrained using training data (e.g., past training pairs of collaboration feedback 146 and a collaboration recommendation 148 generated based on such collaboration feedback 146, where each training pair is assigned a value indicating whether the training pair is a positive or negative training example) in an ongoing manner to generate an output from collaboration feedback 146. By labeling each training pair used to train the generative machine-learning model 210, the recommendation system 130 is configured to bias the generative machine-learning model 210 to generating a collaboration recommendation 148 that is helpful (e.g., a collaboration recommendation 148 that provides a helpful summary of the collaboration feedback and emphasizes trusted data over untrusted data).

For instance, consider a specific example where the collaboration recommendation 148 comprises a summary of collaboration feedback 146 received from a plurality of different engaged users 142 via the collaboration interface 144. In this specific example, the recommendation system 130 trains the generative machine-learning model 210 using supervised learning with a training dataset that includes training pairs of collaboration feedback 146 received from multiple different entities and a corresponding collaboration recommendation 148 that summarizes one or more aspects of the collaboration feedback 146. Continuing this specific example, the generative machine-learning model 210 is trained with an objective to minimize a difference between an output of the model (e.g., the collaboration recommendation 148 that summarizes actual collaboration feedback 146), and the actual collaboration feedback 146. For the task of summarization, the generative machine-learning model 210 is exposed to numerous examples of lengthy data describing collaboration feedback 146 paired with corresponding concise summaries for output as a collaboration recommendation. During training, the recommendation system 130 iteratively optimizes a loss function and causes the generative machine-learning model 210 to generate summaries that capture meaningful insights from the collaboration feedback 146.

Using the loss function, during training internal parameters of the generative machine-learning model 210 are adjusted in a manner that causes the generative machine-learning model 210 to learn relationships between different aspects of the collaboration feedback 146 (e.g., different words, sentences, instances of input 208, and overall structure of the collaboration feedback 146). This training causes the generative machine-learning model 210 to identify syntactical rules (e.g., grammar) as well as semantics included in collaboration feedback 146 (e.g., meaning and context). Upon convergence (e.g., upon the generative machine-learning model 210 producing an output that satisfies a threshold difference relative to a ground truth training example), the generative machine-learning model 210 is implemented by the recommendation system 130 to produce a succinct summary of information included in the collaboration feedback 146 that retains key points and an essence of its original content.

In addition to summarizing the input 208 to the collaboration interface 144, the generative machine-learning model 210 is further trained to summarize information describing engaged users 142 from which the 208 was received. In this manner, the generative machine-learning model 210 is trained to output a collaboration recommendation that not only summarizes collaboration feedback 146, but also provides an artist associated with artist data 128 with insight regarding one or more sources from which the collaboration feedback was received. In some implementations, the generative machine-learning model 210 is trained to favor inclusion and/or emphasis of input 208 received from engaged users 142 having associated profile data indicating that the corresponding user 104 has exhibited previous influence in recommending successful collaboration recommendations.

In doing so, the recommendation system 130 trains the generative machine-learning model 210 to not only provide helpful collaboration recommendations 148 that the generative machine-learning model 210 identifies via learning complex pattern recognition during training (e.g., which is not possible for the human mind to readily identify when presented with collaboration feedback 146 received from multiple users), but also to provide indications as to why the artist can trust the collaboration recommendation 148. For instance, by emphasizing that an entity who has previously recommended that different artists collaborate to generate media content 126 that has experienced a significant number of consumption instances (e.g., millions), the artist viewing the collaboration recommendation 148 in the recommendation interface 150, an artist 116 is able to make an informed decision as to whether to trust the collaboration recommendation 148 and take action.

In some implementations, the generative machine-learning model 210 is configured to generate synthesized media content 126 based on collaboration feedback 146 that identifies various aspects of media content 126 to be featured in a collaboration recommendation. For instance, as described in further detail below with respect to FIG. 5, in some implementations the collaboration interface 144 is configured to include controls that are selectable by engaged users 142 (e.g., via input 208) to specify characteristics of different artists' media content that the engaged users recommend be features in a collaboration. Based on such feedback, the recommendation system 130 is configured to cause the generative machine-learning model 210 to generate synthesized media content 126 that provides a tangible example of what engaged users 142 would like to see created by the artist.

For instance, consider a specific example in which the generative machine-learning model 210 is trained to generate synthesized audio to represent a recommended collaboration between two or more musical artists. In this specific example, the generative machine-learning model 210 is trained using supervised learning using a large training dataset that contains various examples of audio along with labels (e.g., metadata) describing different aspects of the audio, such as vocals, melody, hook, instrumentation, equipment, rhythm, harmony, beat, timbre, dynamics, texture, and so forth. For instance, each of the different audible aspects is isolated and represented in a format that is understandable by the generative machine-learning model 210. Continuing the specific example, vocals are separated from instrumentation, and each instrument is further isolated as its own example audio input for the model. Features such as pitch, tempo, dynamics, and so forth are then extracted and quantified, which enables the generative machine-learning model 210 to learn relationships between different audible features and how they combine to form audible media content 126 as perceived by a listener (e.g., by the audience 106).

In order to cover the vast range of musical styles, equipment types, recording environments, and so forth, the recommendation system 130 is configured to train the generative machine-learning model 210 using a robust training dataset that is highly varied, which enables the generative machine-learning model 210 to generalize to different types of collaboration feedback 146 that otherwise may not be well represented in training data. During training, internal parameters of the generative machine-learning model 210 are adjusted to minimize differences between a predicted output and actual training data used in the training dataset. In such implementations, the generative machine-learning model 210 is configured with architectures configured to process sequential data (e.g., isolated instruments, vocals, etc.), such as Recurrent Neural Networks (RNNs), Long Short-Term Memory (LSTM) networks, or Transformer models, which capture temporal dependencies in audio media content 126.

Advantageously, to generate specific components in synthesized media content 126 like melody or rhythm based on collaboration feedback 146, the recommendation system 130 is configured to train the generative machine-learning model 210 using training data that is structured to map various forms of input 208 to their corresponding audible representation as would be perceived by the audience 106. For example, if the collaboration feedback 146 indicates that there are recommendations for an artist to collaborate with an artist known for having "jazz rhythm with an upbeat tempo," the generative machine-learning model 210 is trained to generate audible media content 126 that matches these criteria, drawing on what it has learned during training about the characteristics that define jazz rhythms and upbeat tempos. In this manner, the recommendation system 130 is configured to leverage one or more models 132, such as one or more generative machine-learning models 210, to generate a collaboration recommendation 148 that summarizes collaboration feedback 146 from engaged users 142 for an artist in a form that is not possible by the engaged users 142 themselves (e.g., by automatically summarizing the collaboration feedback 146 and/or automatically generating synthesized media content 126 based on input 208 to the collaboration interface 144.

The collaboration recommendation 148 is then output by the recommendation system 130 in the recommendation interface 150. In implementations, the recommendation interface 150 is further generated to include one or more controls that are selectable to initiate performance of actions pertaining to the collaboration recommendation 148. Examples of collaboration interfaces 144 from which collaboration feedback 146 is received, as well as collaboration recommendations 148 included in recommendation interfaces 150, along with controls that are selectable to initiate performance of actions recommended by the collaboration recommendation 148, are described in further detail below with respect to FIGS. 3-7.

In implementations, input to one or more controls presented in the recommendation interface 150 causes the recommendation system 130 to update the recommendation interface 150 (e.g., to provide a recommendation for an objective specified via input to the recommendation interface 150). Alternatively or additionally, input to the recommendation interface 150 causes the recommendation system 130 to provide feedback to the model(s) 132 indicating whether recommended actions were performed, as indicated by the dashed arrow returning to the model(s) 132 from the recommendation interface 150. For instance, in response to input at a selectable control included in the recommendation interface 150, feedback is provided to the recommendation system 130 indicating that an action recommended by the collaboration recommendation 1148 was undertaken. This feedback further enables the model(s) 132 to learn trends regarding responses (e.g., by the artist 116) that can be associated as occurring as a result of carrying out a recommended action.

This feedback represents an additional training example that enables the model(s) 132 to learn patterns that can be predicted in response to occurrence of a recommended action (e.g., an artist taking action on a collaboration recommendation 148 serves as a positive training example informing the models 132 that the collaboration recommendation 148 was helpful). Parameters described in each training example provided to the model(s) 132 are useable to define an observed result relative to the collaboration recommendation 148 with varying levels of granularity (e.g., an artist that immediately dismisses and takes no action on a collaboration commendation 148 may be weighted as a more negative training example than an instance where the same artist spends significant time considering a different collaboration recommendation 148 but also does not take action on the different collaboration recommendation).

Feedback to the recommendation system 130 is further useable to quantify whether media content 126 created as a result of a collaboration recommendation 148 was well received or not well received by the audience 106. For instance, the recommendation system 130 is configured to identify when a collaboration recommendation 148 influenced creation of media content 126 via a collaboration by two or more artists and generate additional training examples that quantify the audience's reception to the media content 126 (e.g., via a number of overall consumption instances, via an amount of different users 104 that consumed the media content 126, combinations thereof, and so forth). By consistently providing feedback describing whether a collaboration suggested by the collaboration recommendation 148 occurs, and observed audience data 140 pertaining to media content 126 generated as a result of such a recommended collaboration, the recommendation system 130 guides the model(s) 132 via ongoing training, thus avoiding overfitting the model(s) 132 to original training data.

For a further visualization of the recommendation system 130 outputting a collaboration interface 144, receiving collaboration feedback 146 based on input 208 to the collaboration interface 144, and outputting a collaboration recommendation 148 generated based on the collaboration feedback 146 in a recommendation interface 150, consider FIGS. 3-7 in the context of the following description.

Figure 3:
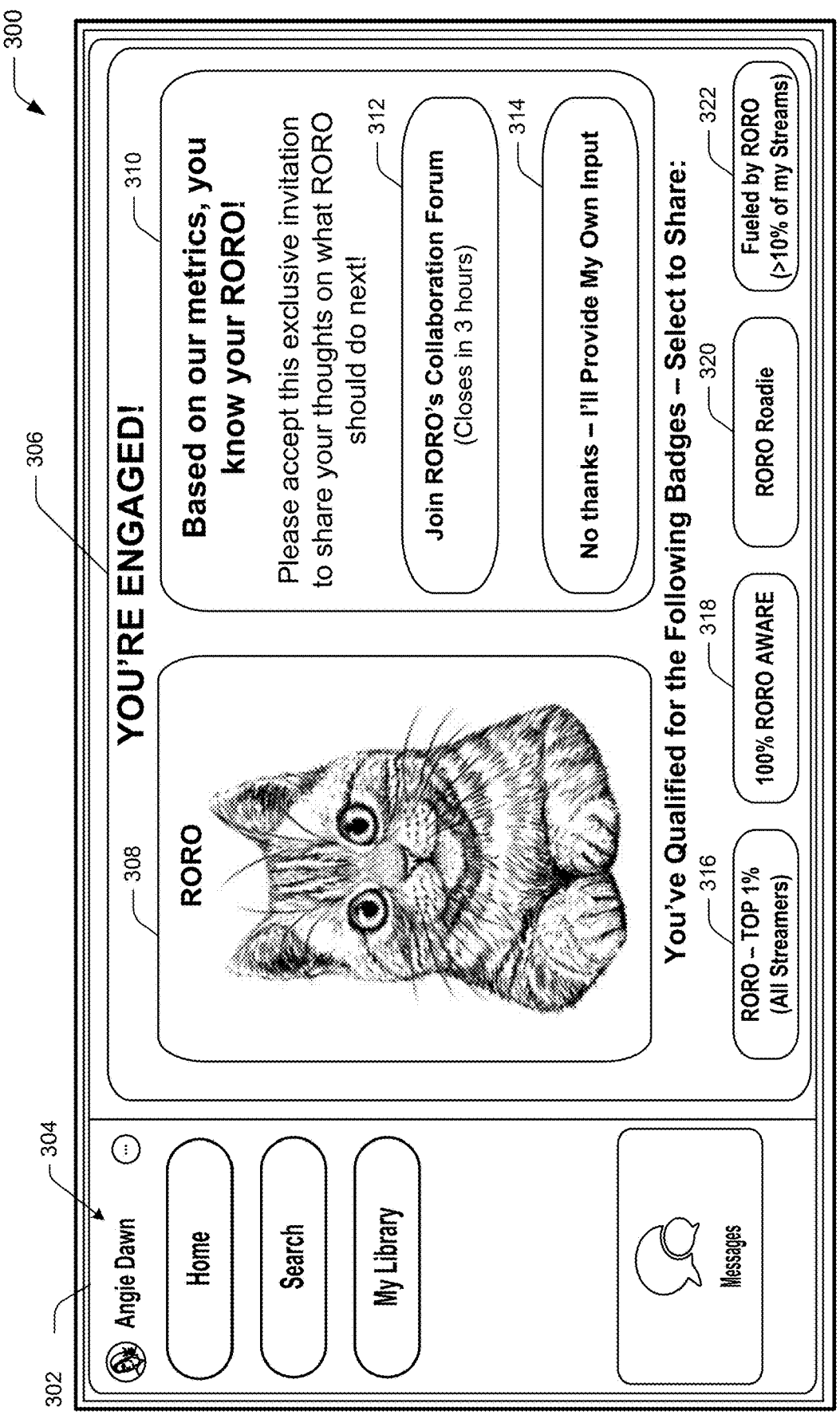
FIG. 3 is a non-limiting example of a user interface output to an engaged user for an artist, as identified by a recommendation system, that includes at least one prompt for feedback regarding a future collaboration by the artist in accordance with one or more implementations described herein.

FIG. 3 is a non-limiting example 300 of a user interface 302 output to one or more engaged users 142 for an artist, as identified by the recommendation system 130, which includes at least one prompt for feedback regarding a future collaboration by the artist.

In the illustrated example 300, the user interface 302 represents an example instance of the collaboration interface 144 output by the recommendation system 130. Specifically, the user interface 302 depicts a scenario where the collaboration interface 144 is output to a user 104, identified by caption 304 as "Angie Dawn," included in the engaged users 142 for an artist 116. The user interface 302 includes a portion 306 that informs the user Angie Dawn that they have qualified as an engaged user for an artist known as "RORO," whose name and likeness is reproduced at portion 308 of the user interface 302. The user interface 302 further includes a portion 310 that informs the engaged user Angie Dawn that one or more metrics represented in their audience data 140 have satisfied the engagement thresholds 204 for inclusion in RORO's engaged users 142. Although not depicted in the illustrated example of FIG. 3, in some implementations the portion 310 includes information that describes one or more metrics of audience data 140 for the user Angie Dawn that resulted in their inclusion in the engaged users 142 for RORO.

Additionally, portion 310 includes selectable controls that enable the engaged user 142 to provide collaboration feedback 146 via various platforms. For instance, portion 310 includes control 312 and control 314. Control 312 is representative of functionality of the user interface 302 that is selectable (e.g., via input 208) to navigate from a current view of the collaboration interface 144 as represented by user interface 302 to a different view in which multiple ones of the engaged users 142 for RORO are able to collectively provide collaboration feedback 146 with one another in a group environment (e.g., in an engaged users 142 forum). Input 208 at the control 312, for instance, causes the collaboration interface 144 to transition from the current view represented by user interface 302 to a different view that presents an engaged users 142 forum, as described in further detail below with respect to FIG. 4. Alternatively, input at the control 314 causes the collaboration interface 144 to transition from the current view represented by user interface 302 to a different view that prompts a user 104 for individual feedback (e.g., independent of a communal forum with one or more other users 104), such as the user interface described in further detail below with respect to FIG. 5.

The user interface 302 additionally includes a plurality of controls that are each selectable (e.g., via input 208) by the user 104 viewing the user interface 302 to initiate performance of one or more actions. For instance, the user interface 302 includes control 316, control 318, control 320, and control 322. Each of the controls 316, 318, 320, and 322 are selectable to add a "Badge" to a user profile corresponding to the user "Angie Dawn." In the illustrated example of FIG. 3, individual ones of the badges associated with controls 316, 318, 320, and 322 are eligible for use by the user based on their respective audience data 140 describing consumption of media content 126 associated with RORO.

Specifically, control 316 is selectable to add a badge (e.g., a display of information) that indicates to others (e.g., to other users 104 of the media content service provider system 102 viewing the user profile identified by "Angie Dawn"), that the user profile is in the top 1% of consumers of media content 126 associated with RORO (e.g., that the user profile has streamed media content 126 created by, or otherwise associated with, RORO more than 99% of all members of the audience 106. The control 318 is selectable to add a badge that indicates to others that the Angie Dawn user profile is "100% RORO Aware," indicating that the user 104 has consumed all instances of media content 126 that are associated with RORO (e.g., all instances of media content 126 associated with RORO that are available for consumption via the media content service provider system 102).

Control 320 is selectable to add a badge that indicates the Angie Dawn user profile is a "RORO Roadie," which may be indicative of the user 104 having attended a threshold number of live events associated with RORO (e.g., at least one RORO live event, multiple RORO events, at least one RORO event in two or more diverse geographical locations, and so forth). Control 322 is selectable to add a badge that indicates the Angie Dawn user profile is above a threshold percentage of instances of media content 126 consumption by the user profile (e.g., that over 10% of all instances of media content 126 consumption via the media content service provider system 102 are of RORO-associated items of media content 126). In this manner, the recommendation system 130 is configured to output the collaboration interface 144 (e.g., the user interface 302) with information informing a user 104 that they have been identified as an engaged fan for an artist, along with one or more controls that are selectable to provide collaboration feedback 146 for the artist. Additionally, the recommendation system 130 is configured to output the collaboration interface 144 with one or more controls that are selectable by an engaged user 142 to publish the fact that they have qualified as an engaged fan for the artist 116. In some implementations, such publication options (e.g., specific badges available to publish to a user's profile) are defined, authorized, or otherwise described by the artist for which the engaged users 142 are identified, thus enabling the artist to provide curated recognition experiences for their dedicated fans.

Figure 4:
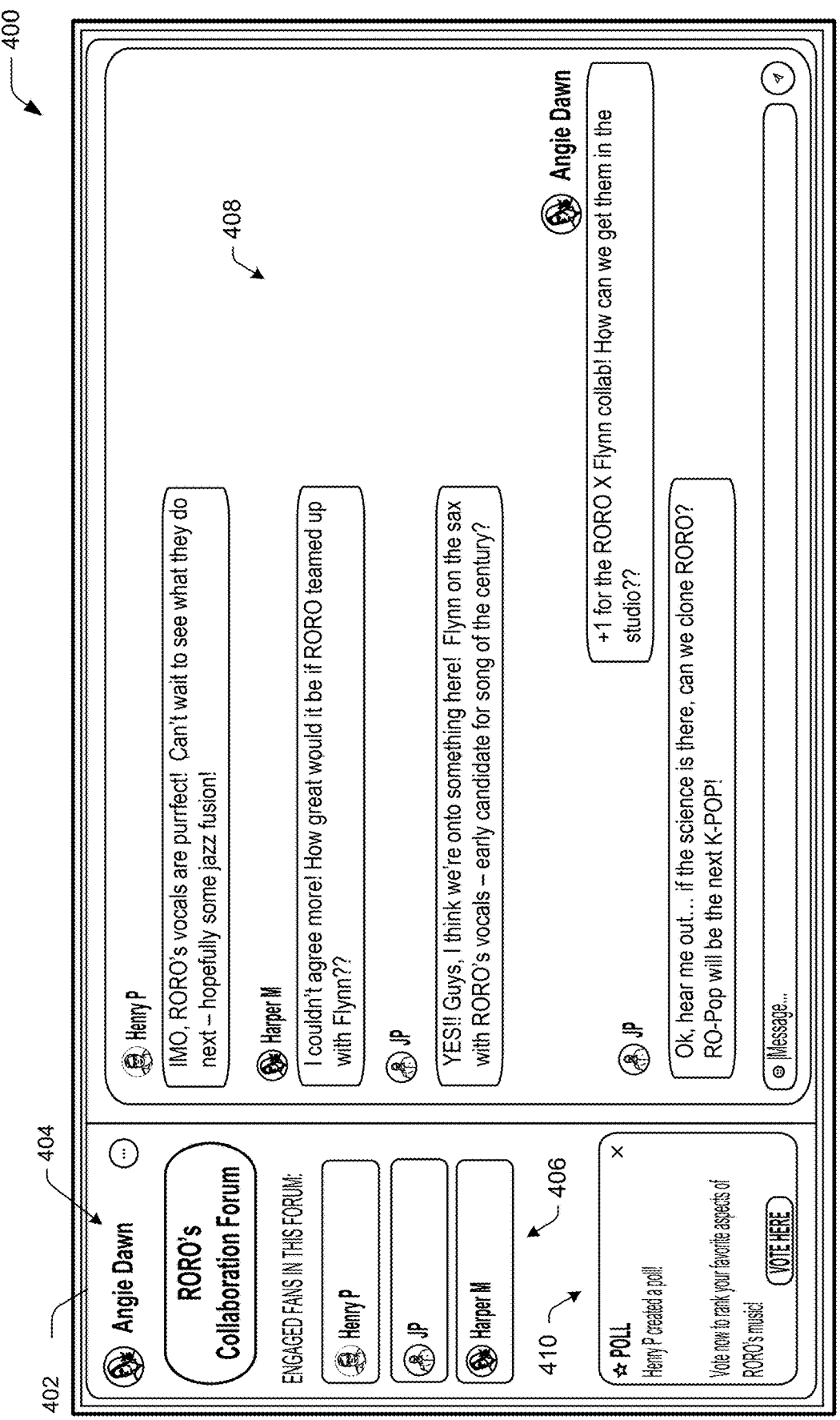
FIG. 4 is a non-limiting example of a user interface that includes a collaboration forum in which multiple engaged users for an artist can provide feedback regarding a future collaboration by the artist in accordance with one or more implementations described herein.

For a further description of functionality offered by the collaboration interface 144 (e.g., in response to receiving input at the control 312), consider FIG. 4.

FIG. 4 is a non-limiting example 400 of a user interface 402 that includes a collaboration forum in which multiple engaged users 142 for an artist 116 can provide feedback regarding a future collaboration by the artist. In the illustrated example 400, the user interface 402 represents an example instance of the collaboration interface 144 output by the recommendation system 130. Specifically, the user interface 402 depicts a scenario in which the collaboration interface 144 is output to the same user 104 as the user interface 302, as identified by the caption 404 (e.g., the user interface 402 is output responsive to input 208 at the control 312 of user interface 302).

The user interface 402 further includes a portion 406 that identifies one or more other users (e.g., one or more users in addition to the user identified by caption 404) that are participating, or are otherwise present, in the collaboration forum for RORO. In this manner, the portion 406 identifies other engaged users 142 that have accepted the limited invitation to provide collaboration feedback 146 as a group of engaged fans for a future collaboration by RORO with at least one additional artist. The communal nature of prompting a group of engaged fans for RORO to provide feedback regarding a future collaboration by RORO is represented by portion 408 of the user interface 402. In the illustrated example 400, portion 408 is configured as a group messaging platform, such as a chat interface, which allows different ones of the engaged users 142 identified at portion 406 to provide input 208 in the form of alphanumeric text, media content 126 (e.g., images, music, video, combinations thereof), and so forth. Portion 408 thus enables engaged users 142 for RORO to provide any suitable type of input 208 to communicate with one another as part of indicating what individual ones of the engaged users 142 would like to see in media content 126 created as a result of RORO collaborating with another artist.

The user interface 402 is additionally depicted as including a portion 410, which includes a selectable option to participate in a poll generated by one of the engaged users 142 identified at portion 406. Specifically, in the illustrated example 400, portion 410 includes a poll created by an engaged fan "Henry P," where the poll prompts engaged users 142 to vote on their favorite aspects of RORO's music. Input to the "VOTE HERE" selectable control included in the portion 410 causes the user interface 402 to display, for instance, a modal window that lists different aspects of RORO's music (e.g., as identified by the engaged fan Henry P, as identified in artist data 128 for RORO, or combinations thereof) and enables the engaged users 142 identified at portion 406 to rank the different aspects of RORO's music (e.g., by assigning ordered values to various ones of the different aspects of RORO's music included in the poll).

Although described and illustrated in the context of including a poll created by an engaged fan, in some implementations the portion 410 includes one or more targeted requests for feedback regarding a future collaboration by a subject artist (e.g., by RORO) that are created automatically by the recommendation system 130 (e.g., independent of user input). For instance, the model(s) 132 of the recommendation system 130 are configured to leverage past instances of collaboration interfaces 144 that resulted in creation of media content 126 by a collaboration between two or more artists and identify engaged fan-created polls, targeted prompts for feedback (e.g., specific questions with associated fields configured to receive answers via input 208), and so forth, which contributed to generation of a successful collaboration recommendation 148. The model(s) 132 are configured to leverage knowledge of these past instances of collaboration interface 144 to automatically generate prompts for targeted collaboration feedback 146 in a manner that adapts the past prompts to the subject artist of the user interface 402.

Input 208 to the user interface 402 (e.g., the portion 408, a poll or other targeted prompt for feedback displayed via response to input at the portion 410, and so forth) is communicated as collaboration feedback 146 to the recommendation system 130, which is subsequently provided as input to the model(s) 132 for processing and generation of a collaboration recommendation 148. For instance, in an example implementation where input 208 to the portion 408 is textual input to a chat communication interface, the collaboration feedback 146 comprises an entirety of the textual input received from each of the engaged users 142 identified at portion 406 via the portion 408. The recommendation system 130 is configured to leverage the generative machine-learning model 210 to generate a summary of the textual input to portion 408, which may state that "All four of your engaged fans think that a collaboration with Flynn, specifically combining your vocals with Flynn's saxophone, is what audiences want to hear!" In some implementations, the generative machine-learning model 210 is configured to generate the collaboration recommendation 148 by emphasizing feedback from certain ones of the engaged users 142 identified at portion 406.

For instance, in implementations where the engaged fans Harper M, Henry P, and JP have not exhibited past participation in successful collaboration recommendations while Angie Dawn has a history of providing collaboration feedback 146 that contributed to generation of media content 126 which was well-received by the audience 106, the recommendation system 130 is configured to emphasize in the collaboration recommendation 148 that the collaboration feedback 146 received via user interface 402 was supported by Angie Dawn. Thus, the illustrated example 400 depicts one configuration of the collaboration interface 144 in which a conversational interface is provided to engaged users 142 of an artist 116 to facilitate discussion as a group for obtaining collaboration feedback 146 regarding a future collaboration by the artist 116.

Figure 5:
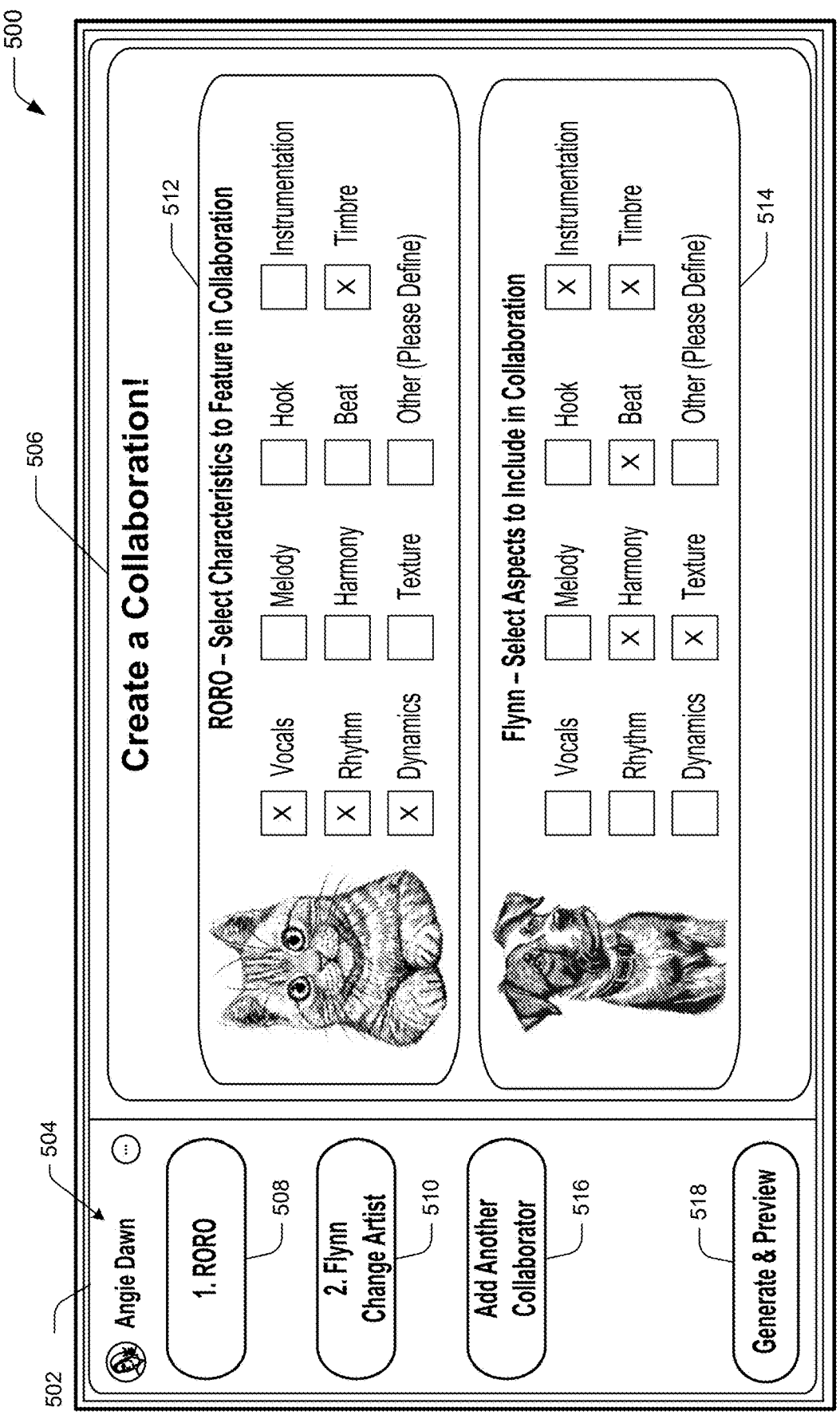
FIG. 5 is a non-limiting example of a user interface that includes controls that are selectable via input by an engaged user for an artist to synthetically generate media content that represents a collaboration between the artist and at least one different artist in accordance with one or more implementations described herein.

For a further description of functionality offered by the collaboration interface 144 (e.g., in response to receiving input at the control 314), consider FIG. 5.

FIG. 5 is a non-limiting example of a user interface 502 that includes controls that are selectable via input 208 by an engaged user 142 for an artist 116 to cause generation of synthesized media content 126 that represents a collaboration between the artist and at least one different artist. In the illustrated example 500, user interface 502 represents an example instance of the collaboration interface 144 output by the recommendation system 130. Specifically, the user interface 502 depicts a scenario in which the collaboration interface 144 is output to the same user 104 as the user interface 302, as identified by the caption 504 (e.g., the user interface 502 is output responsive to input 208 at the control 314 of the user interface 302).

The user interface 502 includes a portion 506 that includes a plurality of selectable controls to define different characteristics attributable to media content 126 associated with a subject artist (e.g., an artist for whom the user 104 identified by caption 504 is identified as an engaged fan) as well as characteristics of media content 126 associated with at least one different artist with whom the user 104 thinks the subject artist should collaborate. In this manner, the user interface 502 provides functionality that enables engaged users 142 to define with specificity how to feature different artists in media content 126 created by a collaboration between the different artists. The user interface 502 further includes controls that are selectable (e.g., via input 208) to define which artists to include in the portion 506. For instance, the user interface 502 includes a portion 508, which identifies that the user interface 502 is being provided as a prompt for feedback regarding a collaboration recommendation 148 for the artist RORO.

The user interface 502 further includes a control 510 that is selectable via input 208 to define an additional artist with which the engaged user 142 identified by caption 504 recommends that RORO collaborate. In the illustrated example 500, input at control 510 indicates that the engaged user 142 identified by caption 504 recommends that RORO collaborate with the artist "Flynn" to generate media content 126. In some implementations, the control 510 is configured to restrict selection of a different artist (e.g., an artist other than RORO) for whom the user identified by caption 504 also qualifies as an engaged user 142. Alternatively, the control 510 permits selection of another artist for whom the user 104 identified by caption 504 is not an engaged fan.

In response to receiving input at the 510 (e.g., input 208 recommending Flynn as an additional artist for collaborating with RORO), portion 506 is updated to include controls for each recommended collaboration artist (e.g., controls for RORO and controls for Flynn) that are selectable to define certain aspects attributable to the artist's work for featuring in collaboration media content 126. Specifically, the illustrated example 500 contemplates a scenario where RORO and Flynn are each musical artists known for creating audible media content 126. In this scenario, the portion 506 is generated by the recommendation system 130 to include a first portion 512 for RORO and a second portion 514 for Flynn. The first portion 512 and the second portion 514 each include a plurality of controls that are individually associated with a distinguishable audible characteristic of RORO's media content 126 and Flynn's media content 126, respectively. For instance, the first portion 512 and the second portion 514 each include controls that are selectable to recommend that one or more of vocals, melody, a hook, instrumentation, rhythm, harmony, beat, timbre, dynamics, texture, or other aspects/characteristics of media content 126 attributable to the corresponding artist be featured in media content 126 created via a collaboration between the different artists.

In some implementations, the controls of the first portion 512 and the second portion 514 are further configurable to define a specific example of media content 126 associated with the artist from which aspects or characteristics to feature in a collaboration. As a specific example, in the context of musical media content 126, input to the "Other" control at second portion 514 enables an engaged user 142 to specify a specific instance of media content 126 associated with Flynn (e.g., a song or album created by Flynn) and to define various aspects of the specific instance of media content 126 to replicate or otherwise imitate in media content 126 created from a collaboration between Flynn and RORO. Continuing this specific example, input at the "Other" control in second portion 514 may cause the user interface 502 to present controls that enable the engaged user 142 to select a song associated with Flynn and specify certain portions of the song (e.g., via slider controls presented adjacent to a timeline representing a playback duration of the song) to feature in a collaboration. In this manner, the collaboration interface 144 is generated to include functionality that enables engaged users 142 to define, with specificity, different characteristics attributable to various artists to feature in collaboration media content 126.

Although the specific example 500 includes controls at portion 506 for recommending a collaboration between only two artists (e.g., RORO and Flynn), in implementations the user interface 502 is configurable to receive input recommending a collaboration among any number of different artists 116. For instance, user interface 502 includes a control 516 that is selectable to define at least one other artist (e.g., in addition to RORO and Flynn) that the engaged user 142 identified by caption 504 recommends for a collaboration to create media content 126. Input at the control 516 defining another artist causes the recommendation system 130 to update portion 506 to include a third portion for the additional artist, with controls similar to those provided by first portion 512 and second portion 514.

The user interface 502 is further depicted as including a control 518, which is selectable by input 208 to cause the recommendation system 130 to automatically generate synthesized media content 126 based on input to the portion 506. For instance, in the illustrated example of 500, input at the portion 506 indicates that the engaged user 142 identified by caption 504 recommends that a collaboration between RORO and Flynn feature RORO's vocals, rhythm, dynamics, and timbre, while also featuring Flynn's instrumentation, harmony, beat, timbre, and texture. This input at portion 506 is provided as collaboration feedback 146 to the recommendation system 130 and input to one or more of the model(s) 132, such as to an instance of the generative machine-learning model 210 trained to generate synthesized audio media content 126.

A collaboration recommendation 148 generated by such a generative machine-learning model 210, which includes synthesized media content 125 featuring RORO's vocals, rhythm, dynamics, and timbre, as well as Flynn's instrumentation, harmony, beat, timbre, and texture is then output for preview (e.g., for playback) via the user interface 502. In implementations, outputting the preview of synthesized media content 126 generated by the recommendation system 130 is further provided with one or more controls that are selectable to provide feedback regarding the synthesized media content 126 (e.g., assigning a score, assigning a binary "good or bad" assessment, and so forth). Engaged users 142 input pertaining to the synthesized media content 126 is provided as feedback to the recommendation system 130 for generating the collaboration recommendation 148 for presentation to RORO and/or Flynn, as well as an additional training example for guiding the model(s) 132 towards subsequent creations of improved synthesized media content 126.

Alternatively or in addition to the examples depicted in FIG. 5, the recommendation system 130 may facilitate other inputs by engaged users 142 as recommendations for collaboration content. For instance, the recommendation system 130 may cause the user interface 502 to include a text entry field in which an engaged user 142 can supply lyrics to recommend to the artists 116 to be included in the collaborative output. In some cases, the recommendation system 130 may be configured to receive audio and/or video files from engaged users 142 that include content (e.g., performed lyrics, musical recordings, choreography, etc.) recommended to be included in a collaboration via the user interface 502.

In some examples, the recommendation system 130 may provide attribution when an engaged user 142 contributes to the content of a collaborative output of two or more artists 116. For instance, if a recommendation provided by an engaged user 142 is included in a collaborative work, a name (or pseudonym) of the engaged user 142 may be included in credits of the collaborative work, embedded as metadata in the collaborative work, included as part of a non-fungible token (NFT) associated with the collaborative work, and so forth.

Figure 6:
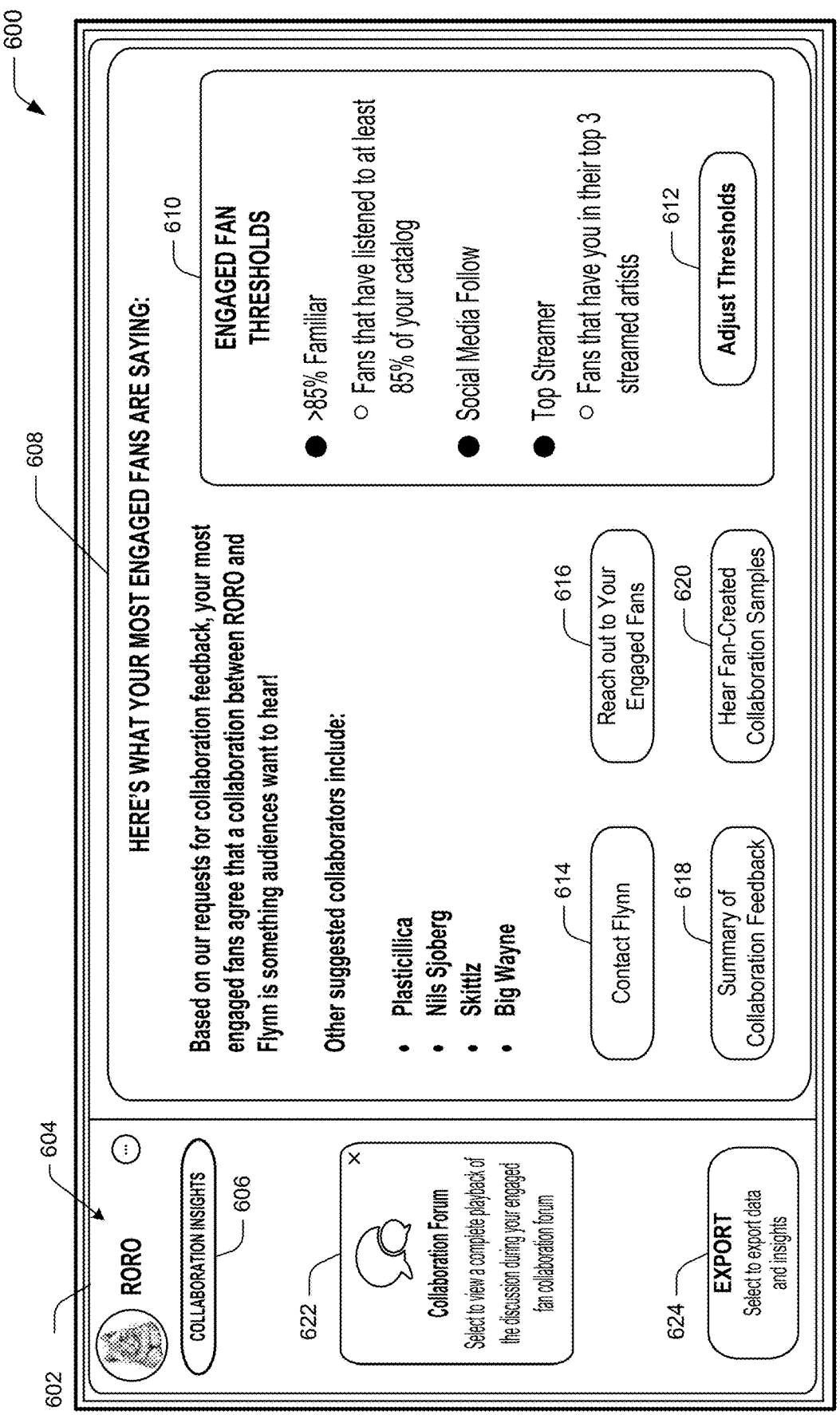
FIG. 6 is a non-limiting example of a user interface that includes a collaboration recommendation generated by the recommendation system in accordance with one or more implementations described herein.

FIG. 6 is a non-limiting example 600 of a user interface 602 that includes a collaboration recommendation 148 generated by the recommendation system 130. The user interface 602 represents an example instance of the recommendation interface 150 output by the recommendation system 130. Specifically, the user interface 602 depicts a scenario where the user interface 602 is provided for the artist RORO, as identified by caption 604 that summarizes collaboration insights provided by RORO's engaged users 142, as indicated by heading 606.

Portion 608 of the user interface 602 includes a summary of collaboration feedback 146 received from RORO's engaged users 142 (e.g., via input 208 to the collaboration interface 144), emphasizing that the engaged users 142 want to see a collaboration between RORO and Flynn. The portion 608 further notes that other artists suggested for collaborating with RORO include Plastillica, Nils Sjoberg, Skittlz, and Big Wayne. Additionally, to provide RORO with information regarding one or more sources from which the collaboration feedback 146 was received, and thus information describing how the collaboration recommendation 148 was generated, the user interface 602 includes portion 610. In the illustrated example 600, portion 610 indicates that the engagement thresholds 204 for identifying RORO's engaged users 142 specify that an engaged fan must have listened to at least 85% of RORO's media content 126, must follow RORO on at least one social media platform, and must stream RORO's media content 126 within the top three of all artists streamed by the user 104. Portion 610 further includes a control 612 that is selectable to adjust the engagement thresholds 204, thus providing RORO with the ability to further refine how the media content service provider system 102 filters the audience 106 to identify engaged users 142 for RORO.

The user interface 602 further includes a plurality of controls that are each selectable via input to initiate performance of an action pertaining to the collaboration recommendation 148. For instance, control 614 is selectable to establish a communication channel between RORO and Flynn for initiating the recommended collaboration. Input to the control 614, for instance, opens a communication channel between respective artist profiles 136 for Flynn and RORO via the media content service provider system 102. Control 616 is selectable to establish one or more communication channels between RORO and engaged users 142 for RORO (e.g., users 104 from whom collaboration feedback 146 was received and used as a basis for generating the collaboration recommendation 148 depicted in user interface 602).

Control 618 is selectable via input to display additional information regarding the collaboration feedback 146, such as a more detailed summary of the collaboration feedback 146, additional information describing one or more of the engaged users 142 from whom collaboration feedback 146 was received, combinations thereof, and so forth. Control 620 is selectable to output fan-created collaboration samples, such as media content 126 generated by one or more of the engaged users 142, media content 126 synthesized by the recommendation system 130 based on collaboration feedback 146, combinations thereof, and so forth. Control 622 is selectable to display an entirety of collaboration feedback 146 provided via a collaboration forum among multiple ones of the engaged users 142, such as an entirety of the collaboration feedback 146 (e.g., a recording of the user interface 402).

Control 624 is selectable to output the collaboration recommendation 148, the collaboration feedback 146 from which the collaboration recommendation 148 was generated, or a combination thereof to a storage location remote from the media content service provider system 102, such as to local storage of a computing device 110 displaying the user interface 602, to an other service provider system 112, and so forth. In this manner, the user interface 602 represents a specific example of how a recommendation interface 150 is output to provide a collaboration recommendation 148 in a manner that succinctly describes collaboration feedback 146 received from engaged users 142 for an artist, provides artist control for defining the engaged users 142, and includes controls that are selectable to initiate performance of an action suggested by the collaboration recommendation 148.

Figure 7:
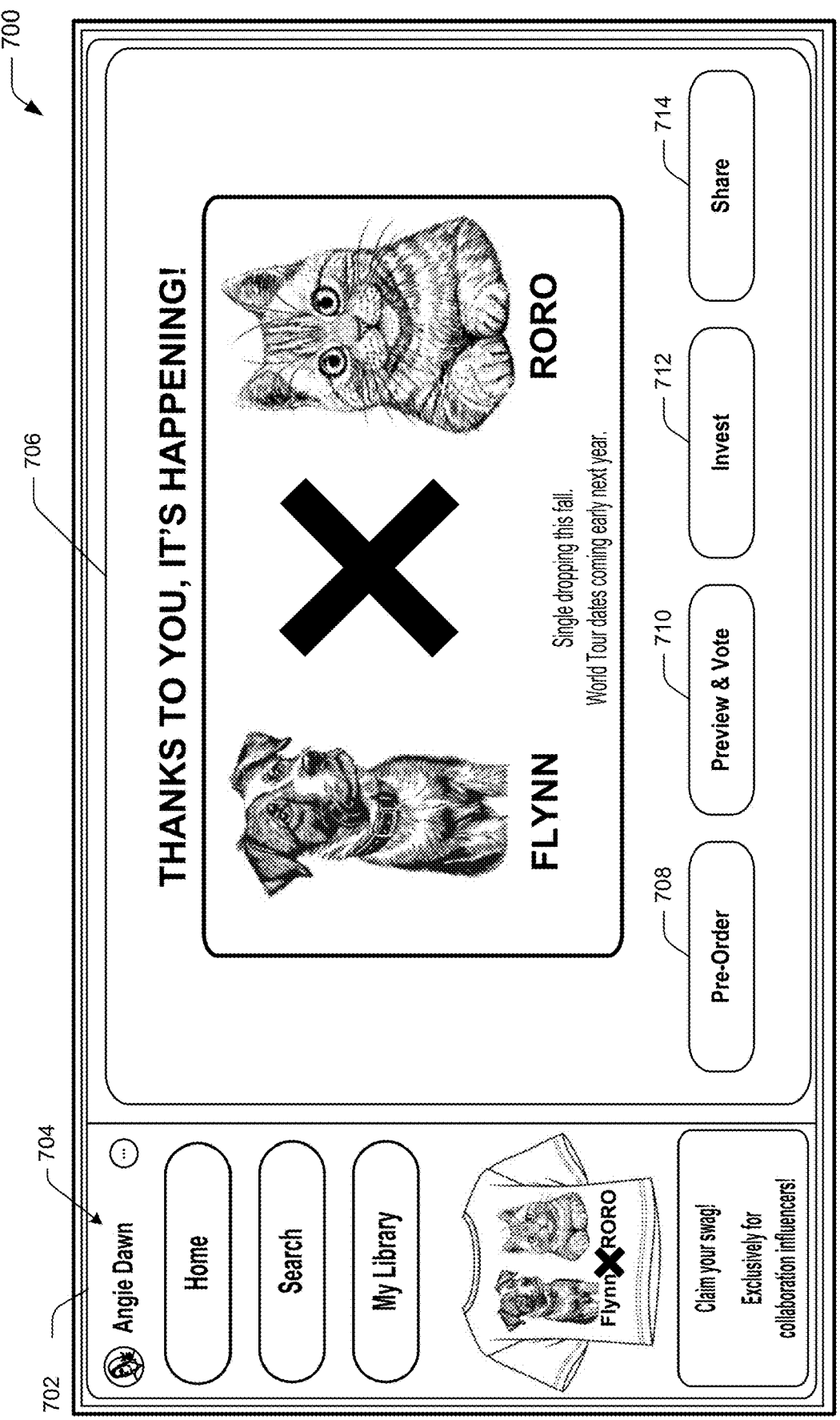
FIG. 7 is a non-limiting example of a user interface that includes an indication of at least one action taken by an artist based on a collaboration recommendation generated by the recommendation system in accordance with one or more implementations described herein.

FIG. 7 is a non-limiting example 700 of a user interface 702 that includes an indication of at least one action taken by an artist based on a collaboration recommendation 148 generated by the recommendation system 130. In the illustrated example 700, the user interface 702 represents an example instance of a collaboration interface 144 output to an engaged user 142 for an artist, specifically the user "Angie Dawn," as identified by caption 704. The user interface 702 further includes a portion 706 that indicates a collaboration is happening between Flynn and RORO, as was suggested by prior collaboration feedback 146 received from Angie Dawn (e.g., via input 208 to a prior instance of the collaboration interface 144). The user interface 702 includes a plurality of controls that are individually selectable to perform one or more actions pertaining to the Flynn and RORO collaboration.

For instance, portion 706 includes control 708, which is selectable by the engaged user 142 to pre-order media content 126 created as a result of the collaboration between Flynn and RORO. Control 710 is selectable for the user to preview media content 126 created by RORO and Flynn, and optionally to provide feedback (e.g., vote on favorite parts of the media content 126, favorite instances of media content 126, provide general comments on the collaboration, and so forth). Control 712 is selectable for the engaged user 142 to invest in (e.g., to finance) the collaboration, such as to contribute to a crowdfunding initiative supporting the collaboration between Flynn and RORO (e.g., via the communication channels and techniques described below with respect to FIGS. 10-12). Finally, control 714 is selectable via input to share the announcement of the collaboration between RORO and Flynn, such as to publish information that Flynn and RORO are collaborating to create media content 126 via one or more social media accounts of the "Angie Dawn" engaged user 142.

Input at one or more of the controls of the user interface 702 is monitored by the recommendation system 130 and used to update artist data 128 for the artist, provide feedback in the form of additional training examples to the model(s) 132, or a combination thereof. For instance, in response to detecting input at 710 providing feedback on a sample of media content 126 created by RORO and Flynn, and/or in response to detecting input at control 712 conveying financial support for the collaboration, artist data 128 for RORO and Flynn is updated to reflect support for the collaboration thereof. Alternatively or additionally, a training example is generated for the model(s) 132 based on observed results in the artist data 128 that occur in response to the collaboration announcement (e.g., resulting increases in consumption of media content 126 associated with RORO and/or Flynn, audience sentiments reflected in social media posts, combinations thereof, and so forth).

The following discussion describes examples of procedures for generating action item recommendations based on artist data. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, the following procedures include discussion of examples from the figures above but are not necessarily limited to the examples from those figures. In one or more implementations, for example, the procedures may be implemented using different systems (which can optionally include one or more components from the example systems described herein).

Figure 8:
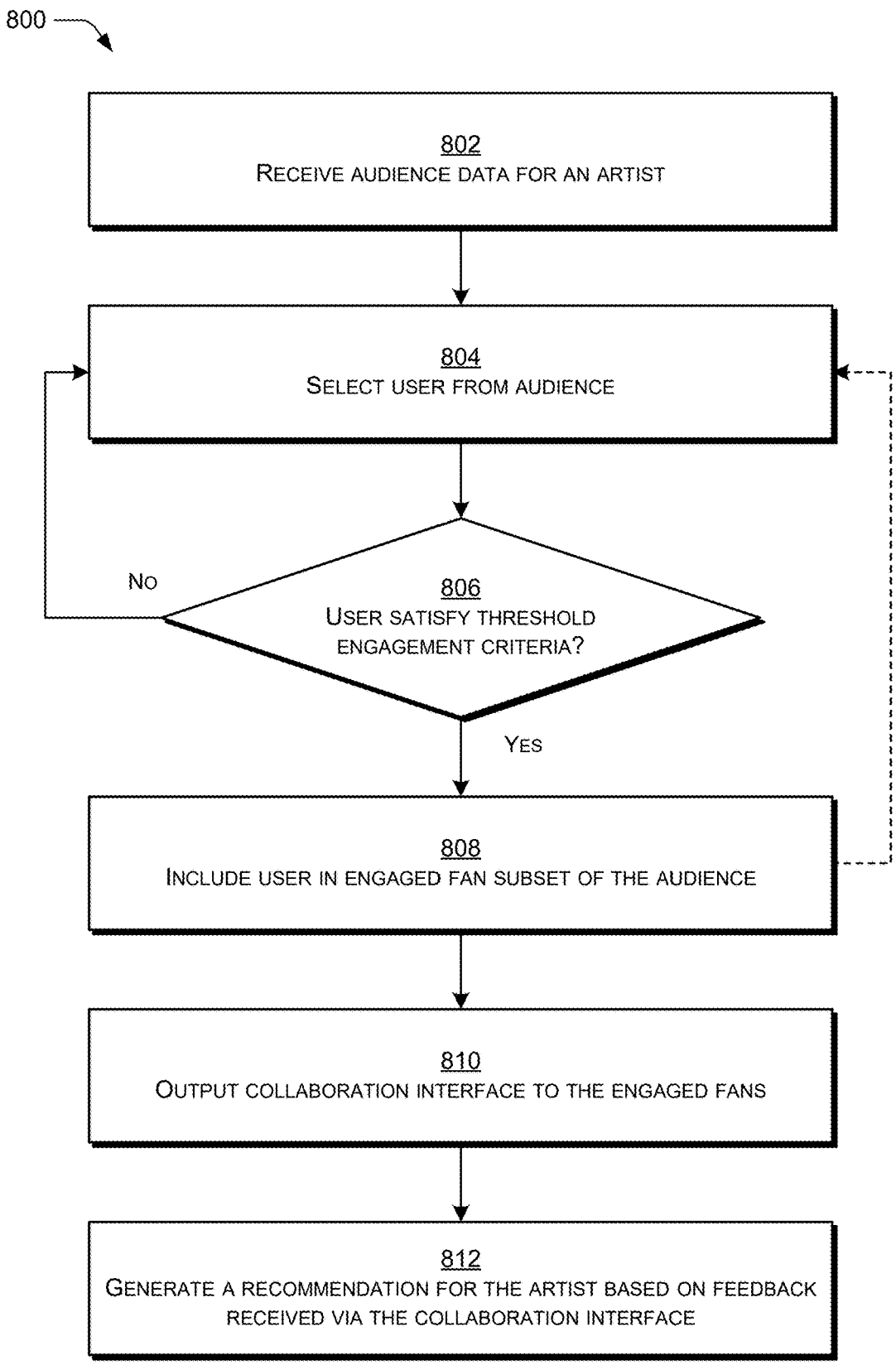
FIG. 8 is a procedure in an example implementation of a recommendation system generating a collaboration recommendation for an artist in accordance with one or more implementations described herein.

FIG. 8 is a flow diagram depicting an algorithm as a step-by-step procedure 800 in an example implementation that is performable by a processing device to generate a collaboration recommendation for an artist.

To begin, audience data for an artist is received (block 802). The recommendation system 130, for instance, obtains audience data 140 for an artist identified by artist profile 136 (e.g., from storage 122 of the media content service provider system 102). A user is then selected from the audience data (block 804). The recommendation system 130, for instance, identifies different users 104 in the audience data 140 that have consumed at least one instance of media content 126 associated with the artist profile 136.

A determination is made as to whether the user satisfies threshold engagement criteria for the artist (block 806). The engagement filtering module 202, for instance, evaluates whether audience data 140 for the selected user satisfies one or more engagement thresholds for the artist. In response to determining that the user does not satisfy the threshold engagement criteria for the artist (e.g., a "No" determination at block 806), operation returns to block 804, where a different user is selected from the audience data 140. Alternatively, in response to determining that the user satisfies the threshold engagement criteria for the artist (e.g., a "Yes" determination at block 806), the user is included in an engaged fan subset of the audience (block 808). The recommendation system 130, for instance, adds the selected user to the engaged users 142 for the artist and updates the audience data 140 in the artist profile 136 to note that the user has been added to the engaged users 142. Operation then optionally returns to block 804, where the recommendation system 130 continues to evaluate additional users in the audience data 140 (e.g., until all users in the audience data 140 have been evaluated relative to engagement thresholds 204, until a threshold number of users have been included in the engaged users 142, etc.), as indicated by the dashed arrow returning from block 808 to block 804.

A collaboration interface is then output to the engaged fans for the artist (block 810). The recommendation system 130, for instance, outputs the collaboration interface 144 to one or more of the engaged users 142 for the artist 116. A recommendation is then generated for the artist based on feedback received via the collaboration interface (block 812). The recommendation system 130, for instance, obtains collaboration feedback 146 based on input 208 to the collaboration interface 144 (e.g., from one or more of the engaged users 142). In some implementations, the collaboration feedback 146 is provided as input to one or more model(s) 132 (e.g., to a generative machine-learning model 210) trained to output a collaboration recommendation 148 based on the collaboration feedback 146. The collaboration recommendation 148 is then provided to the artist (e.g., via output in a recommendation interface 150).

Figure 9:
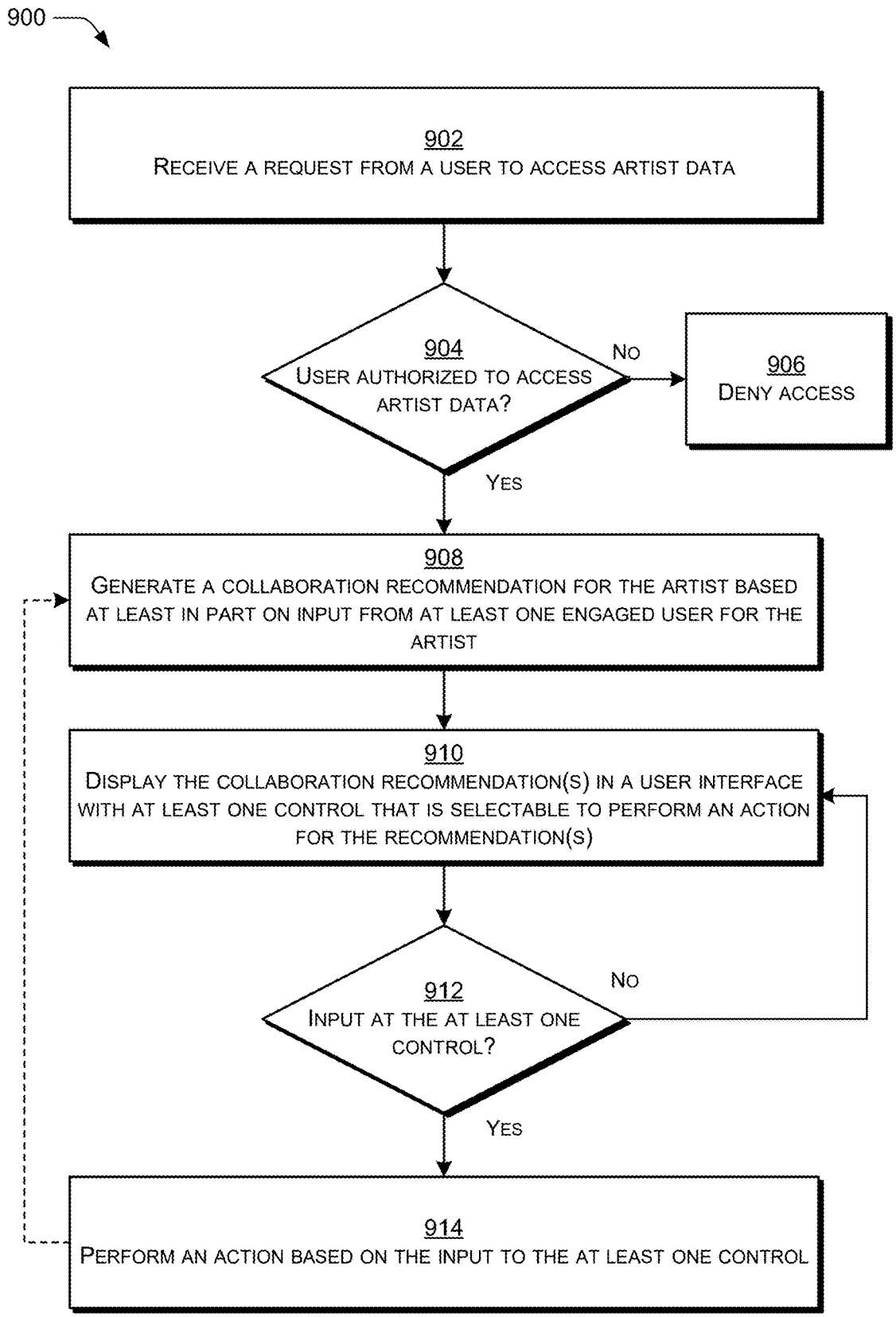
FIG. 9 is a procedure in an example implementation of a recommendation system displaying a collaboration recommendation in a user interface with at least one control that is selectable to perform an action for the collaboration recommendation.

FIG. 9 is a flow diagram depicting an algorithm as a step-by-step procedure 900 in an example implementation that is performable by a processing device to display a collaboration recommendation in a user interface with at least one control that is selectable to perform an action for the collaboration recommendation.

A request is received from a user to access artist data (block 902). The media content service provider system 102, for instance, receives a request from computing device 110 to access artist data 128 and/or display a recommendation interface 150, where the request is received with login data for the user from which the request is received. A determination is made as to whether the user is authorized to access the artist data (block 904). The media content service provider system 102, for instance, compares entity credentials included in the login data to artist data 128 to determine whether the entity credentials identify an artist associated with the artist data 128 or an authorized agent of the artist. In response to determining that the user is not authorized to access the artist data (e.g., a "No" determination at block 904), the user is denied access to the artist data 128 (block 906).

Alternatively, in response to determining that the user is authorized to access the artist data (e.g., a "Yes" determination at block 904), a collaborative recommendation is generated for the artist based at least in part on input from at least one engaged user for the artist (block 908). The recommendation system 130, for instance, obtains collaboration feedback 146 based on input 208 to the collaboration interface 144 (e.g., from one or more of the engaged users 142). In some implementations, the collaboration feedback 146 is provided as input to one or more model(s) 132 (e.g., to a generative machine-learning model 210) trained to output a collaboration recommendation 148 based on the collaboration feedback 146.

The collaboration recommendation is then displayed in a user interface with at least one control that is selectable to perform an action for the recommendation (block 910). The recommendation system 130, for instance, outputs a display of the collaboration recommendation 148 in a recommendation interface 150 surfaced at a computing device 110 from which the request to access the artist data 128 is received. As a specific example, the recommendation system 130 causes display of the user interface 602 at the computing device 110.

A determination is made as to whether input is received at the at least one control (block 912). The recommendation system 130, for instance, monitors for input to the recommendation interface 150 during display at the 110. In response to not detecting input at the at least one control (e.g., a "No" determination at block 912), the recommendation system 130 continues monitoring for input at the recommendation interface 150 while the recommendation interface 150 is displayed at the computing device 110, as indicated by the arrow returning to block 910 from block 912.

Alternatively, in response to detecting input at the at least one control (e.g., a "Yes" determination at block 912), an action is performed based on the input to the at least one control (block 914). The recommendation system 130, for instance, monitors for input to one or more of the controls displayed in user interface 602, such as control 612, control 614, control 616, control 618, control 620, control 622, and control 624. In response to receiving input at the control 612, for instance, the recommendation system 130 updates the engagement thresholds 204 used to identify the engaged users 142 for the artist. In response to receiving input at control 614, for instance, the recommendation system 130 establishes a communication channel between the subject artist and a different artist (e.g., establishes a communication channel between RORO and Flynn, such as a text messaging channel, a telecommunications channel, a video messaging channel, a social media communication channel, or a combination thereof).

In response to receiving input at control 616, for instance, the recommendation system 130 establishes one or more communication channels between the artist 116 and one or more engaged users 142 from whom collaboration feedback 146 was received as part of generating the collaboration recommendation 148. In response to receiving input at control 618, for instance, the recommendation system 130 generates a summary of the collaboration feedback 146 (e.g., using an instance of the generative machine-learning model 210) and output the collaboration feedback 146 summary in the recommendation interface 150. In response to receiving input at the control 620, for instance, the recommendation system 130 generates synthesized media content 126 (e.g., using an instance of the generative machine-learning model 210), and outputs the media content 126 for playback via the recommendation interface 150. In response to receiving input at the control 622, for instance, the recommendation system 130 outputs an entirety of a collaboration forum from which collaboration feedback 146 was received, such as a playback of a recording of the user interface 402. In response to receiving input at control 624, for instance, the recommendation system 130 exports data including the collaboration recommendation 148, the collaboration feedback 146, or a combination thereof to one or more storage locations other than the media content service provider system 102. Operation then optionally returns to block 908 to display an updated collaboration recommendation (e.g., based on additional collaboration feedback 146, based on input to the recommendation interface 150, or combinations thereof), as indicated by the dashed arrow returning from block 914 to block 908.

Figure 10:
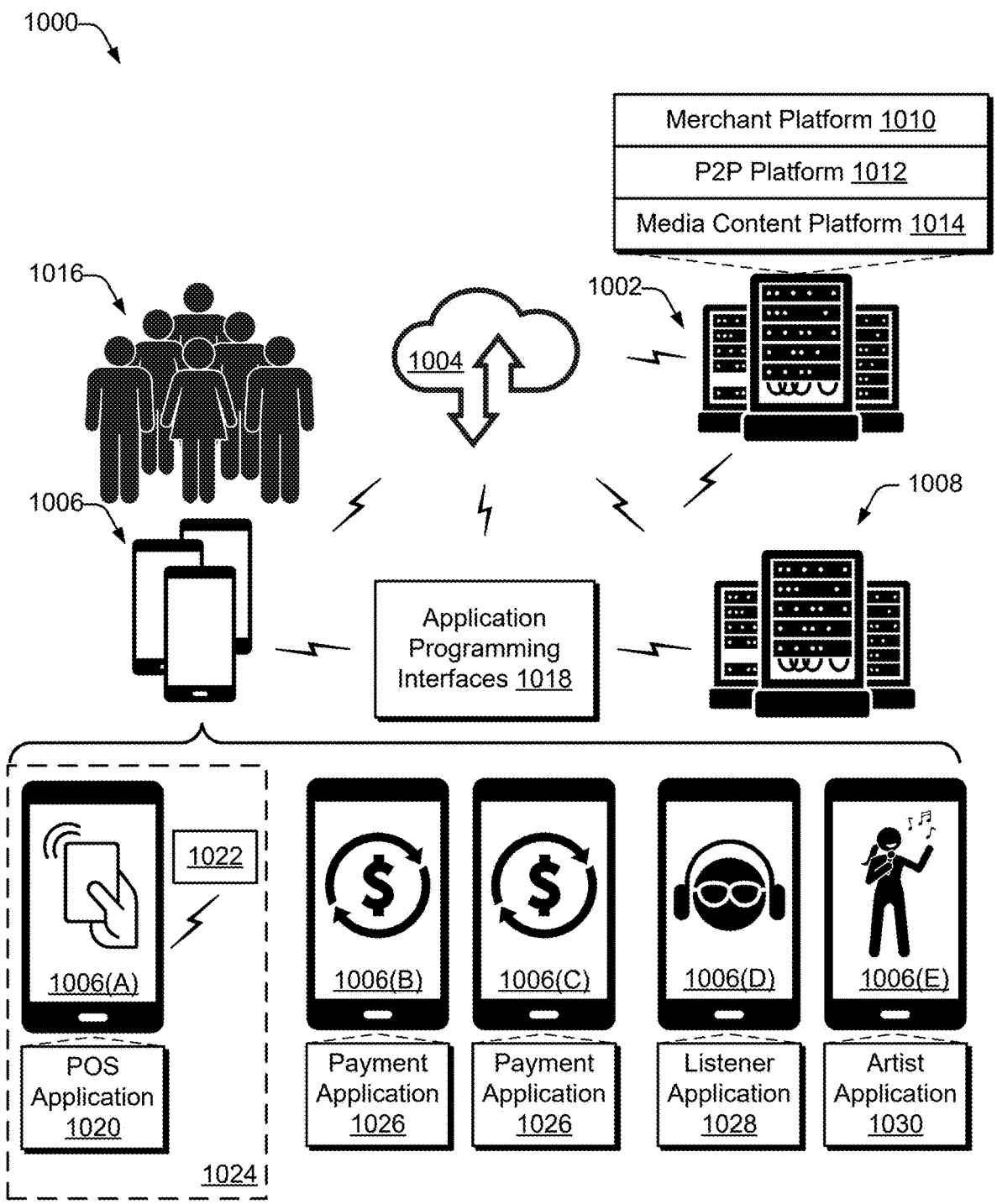
FIG. 10 is a non-limiting example illustrating an environment in which collaboration recommendation techniques described herein are performed in accordance with one or more implementations.

FIG. 10 illustrates an example environment 1000 in which recommendation techniques described herein are performed in accordance with one or more implementations.

The environment 1000 includes server(s) 1002 that can communicate over a network 1004 with end user devices 1006 and/or server(s) 1008 associated with third-party service provider(s). In various examples, the end user devices 1006 may comprise one or more seller devices 1006(A), one or more user devices 1006(B) and/or 1006(C) in a peer network, one or more content consumption devices 1006(D), one or more artist devices 1006(E), combinations of these examples, or other categories of user devices. The server(s) 1002 can be associated with one or more service providers that can provide one or more services for the benefit of users 1016, as described below. For example, the server(s) 1002 may enable services of service providers such as in association with a seller platform 1010 (which may further include a buyer platform), a peer-to-peer (P2P) payment platform 1012, a media content platform 1014, a combination of these platforms, or other platforms associated with other service providers. While services and features are referenced throughout in connection with a particular one of the seller platform 1010, the P2P payment platform 1012, or the media content platform 1014, it should be understood that any of these platforms may perform the functionality described in relation to any of the other platforms. Actions attributed to the service provider(s) can be performed by the server(s) 1002.

For instance, the media content platform 1014 is representative of the media content service provider system 102, and as such represents functionality provided by the recommendation system 130 (e.g., to generate collaboration interfaces 144 and recommendation interfaces 150 in accordance with the techniques described herein).

In some examples, individual ones of the end user devices 1006 can be operable by users 1016. The users 1016 (individually referred to herein as "user 1016") can be referred to as customers, buyers, merchants, sellers, borrowers, employees, employers, payors, payees, couriers, artists, musicians, listeners, fans, supervisors, hosts, audience members, and so on. The users 1016 can interact with the end user devices 1006 via user interfaces presented via the end user devices 1006. In at least one example, a user interface can be presented via a web browser, or the like. Alternatively or additionally, a user interface can be presented via an application, such as a mobile application or desktop application, which can be provided by the seller platform 1010, the P2P payment platform 1012, and/or the media content platform 1014, or which can be an otherwise dedicated application. In some examples, individual end user devices 1006 can have an instance or versioned instance of an application, which can be downloaded from an application store, for example, which can present the user interface(s) described herein.

In at least one example, the users 1016 can include merchants that can operate the seller device(s) 1006(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1006(A) can have an instance of a point of sale ("POS") application 1020 stored thereon. The POS application 1020 can configure the seller device 1006(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1020 can determine transaction data associated with the POS transactions. Transaction data can include payment information, which can be obtained from a reader device 1022 associated with the seller device 1006(A), user authentication data, purchase amount information, point-of-purchase information (e.g., item(s) purchased, date of purchase, time of purchase, subscription type, etc.), etc. The POS application 1020 can send transaction data to the server(s) 1002 such that the server(s) 1002 can track transactions of the customers, merchants, and/or the users 1016 over time. Furthermore, the POS application 1020 can present a user interface to enable the merchant to interact with the POS application 1020 and/or the seller platform 1010 via the POS application 1020.

In at least one example, the seller device 1006(A) can be a special-purpose computing device configured as a POS terminal (via the execution of the POS application 1020). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the seller device 1006(A), such as a microphone port, a headphone port, an audio-jack, a data port, or other suitable port. In additional or alternative examples, the reader device 1022 can be coupled to the seller device 1006(A) via another wired or wireless connection, such as via Bluetooth®, BLE, and so on. In some examples, the reader device 1022 can be a software solution executing on the POS terminal, e.g., a mobile phone. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1022, and communicate with the seller platform 1010, which can provide, among other services, a payment processing service. The server(s) 1002 associated with the seller platform 1010 can communicate with server(s) 1008, as described below. In this manner, the POS terminal and reader device 1022 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to customers of a merchant. In additional or alternative examples, the POS terminal can have a display integrated therein for presenting information to the customers of the merchant. POS systems, such as the POS system 1024, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1022, whereby the reader device 1022 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1024, the server(s) 1002, and/or the server(s) 1008 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1008.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1008 associated therewith) can forward the fund transfer request to an issuing bank (e.g., "issuer"). The issuer is a bank or financial institution that offers a financial account (e.g., credit or debit card account) to a user. The issuer (e.g., the server(s) 1008 associated therewith) can make a determination as to whether the customer has the capacity to absorb the relevant charge associated with the payment transaction. In at least one example, the seller platform 1010 can serve as an issuer and/or can partner with an issuer. The transaction is either approved or rejected by the issuer and/or the card payment network (e.g., the server(s) 1008 associated therewith), and a payment authorization message is communicated from the issuer to the POS device via a path opposite of that described above, or via an alternate path.

The server(s) 1008 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1008 to authorize or decline transactions (e.g., the API 1018). In examples, the seller platform 1010 can enable the merchants to receive cash payments, payment card payments, and/or electronic payments from customers for POS transactions and the service provider can process transactions on behalf of the merchants.

Based on the authentication notification that is received by the POS system 1024 from server(s) 1002, the merchant may indicate to the customer whether the transaction has been approved. In some examples, approval may be indicated at the POS system 1024, for example, at a display of the POS system 1024. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1010 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1006 can access all of the services. In some cases, the user devices 1006 can have gradated access to the services, which can be based on risk tolerance, IDV outputs, subscriptions, and so on. In at least one example, access to such services can be availed to the merchants via the POS application 1020. In additional or alternative examples, each service can be associated with its own access point (e.g., application, web browser, etc.).

As the seller platform 1010 processes transactions on behalf of the merchants, the seller platform 1010 can maintain accounts or balances for the merchants in one or more ledgers. For example, the seller platform 1010 can analyze transaction data received for a transaction to determine an amount of funds owed to a merchant for the transaction and deposit funds into an account of the merchant. The account can have a stored balance, which can be managed by the seller platform 1010. The account can be different from a conventional bank account at least because the stored balance is managed by a ledger of the seller platform 1010 and the associated funds are accessible via various withdrawal channels including, but not limited to, scheduled deposit, same-day deposit, instant deposit, and a linked payment instrument.

A scheduled deposit can occur when the seller platform 1010 transfers funds associated with a stored balance of the merchant to a bank account of the merchant that is held at a bank or other financial institution (e.g., associated with the server(s) 1008). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1010 to the bank account of the merchant.

In at least one example, the seller platform 1010 may provide inventory management services. That is, the seller platform 1010 may provide inventory tracking and reporting. Inventory management services may enable the merchant to access and manage a database storing data associated with a quantity of each item that the merchant has available (i.e., an inventory). Furthermore, in at least one example, the seller platform 1010 can provide catalog management services to enable the merchant to maintain a catalog, which can be a database storing data associated with items that the merchant has available for acquisition (i.e., catalog management services). The seller platform 1010 can offer recommendations related to pricing of the items, placement of items on the catalog, and multi-party fulfillment of the inventory, to name a few examples.

In at least one example, the seller platform 1010 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1010 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1010 can provide financing services for offering and/or lending a loan to a borrower that is to be used for, in some instances, financing the borrower's short-term operational needs (e.g., a capital loan). Additionally or alternatively, the seller platform 1010 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1010 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1010 can provide web-development services, which enable users 1016 who are unfamiliar with HTML, XML, JavaScript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1010 can recommend and/or generate content items to supplement omni-channel presences of the merchants.

Furthermore, the seller platform 1010 can provide payroll services to enable employers to pay employees for work performed on behalf of employers. In at least one example, the seller platform 1010 can receive data that includes time worked by an employee (e.g., through imported timecards and/or POS interactions), sales made by the employee, gratuities received by the employee, and so forth. Based on such data, the seller platform 1010 can make payroll payments to employee(s) on behalf of an employer via the payroll service. For instance, the seller platform 1010 can facilitate the transfer of a total amount to be paid out for the payroll of an employee from the bank of the employer to the bank of the seller platform 1010 to be used to make payroll payments. In at least one example, when the funds have been received at the bank of the seller platform 1010, the seller platform 1010 can pay the employee, such as by check or direct deposit.

Moreover, in at least one example, the seller platform 1010 can provide employee management services for managing schedules of employees. Further, the seller platform 1010 can provide appointment services for enabling users 1016 to set schedules for scheduling appointments and/or users 1016 to schedule appointments.

In some examples, the seller platform 1010 can provide restaurant management services to enable users 1016 to make and/or manage reservations, to monitor front-of-house and/or back-of-house operations, and so on. In such examples, the seller device(s) 1006(A) and/or server(s) 1002 can be configured to communicate with one or more other computing devices, which can be located in the front-of-house (e.g., POS device(s)) and/or back-of-house (e.g., kitchen display system(s) (KDS)). In at least one example, the seller platform 1010 can provide order management services and/or fulfillment services to enable restaurants (or other merchant types) to manage open tickets, split tickets, and so on and/or manage fulfillment services.

In some examples, the seller platform 1010 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1010 can leverage other merchants and/or sales channels that are part of the seller platform 1010 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1010 can enable conversational commerce via conversational commerce services, which can use one or more machine learning mechanisms to analyze messages exchanged between two or more users 1016, voice inputs into a virtual assistant or the like, to determine intents of user(s) 1016. In some examples, the seller platform 1010 can utilize determined intents to automate customer service, offer promotions, provide recommendations, or otherwise interact with customers in real-time. In at least one example, the seller platform 1010 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1016 may be new to the seller platform 1010 such that the user 1016 that has not registered (e.g., subscribed to receive access to one or more services offered by the seller platform 1010) with the seller platform 1010. The seller platform 1010 can offer onboarding services for registering a potential user 1016 with the seller platform 1010. In some examples, onboarding can involve presenting various questions, prompts, and the like to a potential user 1016 to obtain information that can be used to generate a profile for the potential user 1016. In at least one example, the seller platform 1010 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1010 can be transitioned to more permissive (e.g., less limited) or longer-term access to such services.

The seller platform 1010 can be associated with IDV services, which can be used by the seller platform 1010 for compliance purposes and/or can be offered as a service, for instance to third-party service providers (e.g., associated with the server(s) 1008). That is, the seller platform 1010 can offer IDV services to verify the identity of users 1016 seeking to use or using their services. Identity verification may involve requesting a customer (or potential customer) to provide information that is used by compliance departments to prove that the information is associated with an identity of a real person or entity (e.g., an artist). In at least one example, the seller platform 1010 can perform services for determining whether identifying information provided by a user 1016 accurately identifies the customer (or potential customer).

Techniques described herein can be configured to operate in both real-time/online and offline modes. "Online" modes refer to modes when devices are capable of communicating with the seller platform 1010 while offline mode refers to modes when devices are unable to communicate with the server(s) 1008 due to network connectivity issue, for example. In such examples, devices may operate in "offline" mode where at least some payment data is stored (e.g., on the seller device(s) 1006(A)) and/or the server(s) 1002 until connectivity is restored and the payment data can be transmitted to the server(s) 1002 and/or the server(s) 1008 for processing.

In at least one example, the seller platform 1010 can be associated with a hub, such as an order hub, an inventory hub, a fulfillment hub and so on, which can enable integration with one or more additional service providers (e.g., associated with the additional server(s) 1008). In some examples, such additional service providers can offer additional or alternative services and the service provider can provide an interface or other computer-readable instructions to integrate functionality of the service provider into the one or more additional service providers.

Turning now to the P2P functionality provided by the environment 1000, the P2P platform 1012 can provide a peer-to-peer payment service that enables peer-to-peer payments between two or more of the users 1016. Two or more of the users 1016 may be considered "peers" in a peer-to-peer interaction, such as a payment. In at least one example, the P2P platform 1012 can communicate with instances of a payment application 1026 (or other access point) installed on end user devices 1006 configured for operation by the users 1016. In an example, an instance of the payment application 1026 executing on a first user device 1006(B) operated by a payor (e.g., one of the users 1016) can send a request to the P2P platform 1012 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1016) via a peer-to-peer payment. In some examples, assets associated with an account of the payor are transferred to an account of the payee. In some examples, assets can be held at least temporarily in an account of the P2P platform 1012 prior to transferring the assets to the account of the payee.

Figure 11:
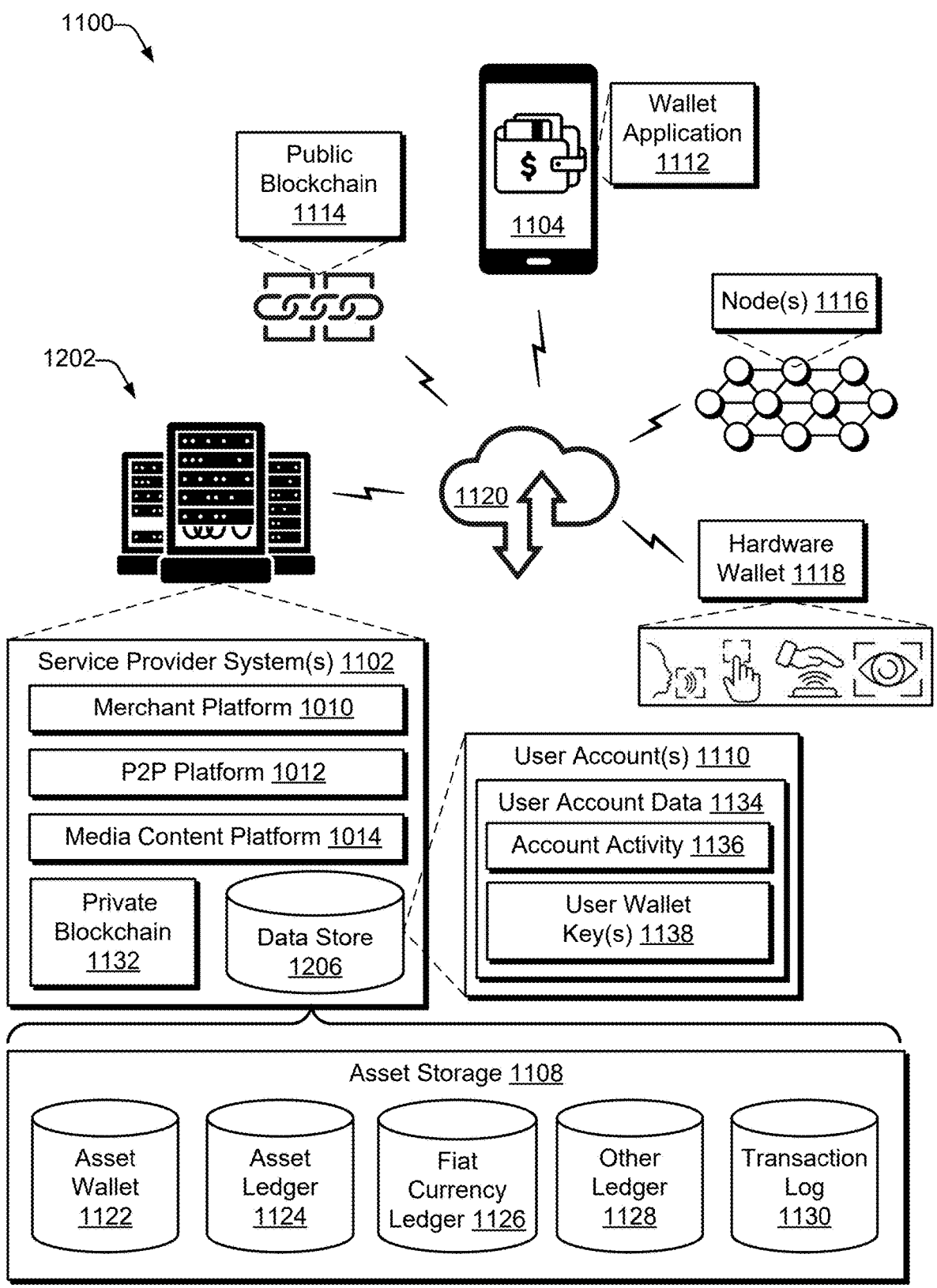
FIG. 11 is a non-limiting example illustrating an environment in which collaboration recommendation techniques described herein are performed in accordance with one or more implementations.

In some examples, the P2P platform 1012 can utilize a ledger system to track transfers of assets between users 1016. FIG. 11, below, provides additional details associated with such a ledger system. The ledger system can enable users 1016 to own fractional shares of assets that are not conventionally available. For instance, a user can own a fraction of a Bitcoin, an NFT, or a stock. Additional details are described herein.

In at least one example, the P2P platform 1012 can facilitate transfers and can send notifications related thereto to instances of the payment application 1026 executing on user device(s) of payee(s). As an example, the P2P platform 1012 can transfer assets from an account of a first user to an account of a second user and can send a notification to the user device 1006(B) of the second user for presentation via a user interface. The notification can indicate that a transfer is in process, a transfer is complete, or the like. In some examples, the P2P platform 1012 can send additional or alternative information to the instances of the payment application 1026 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1012 funds the request to payee on behalf of the payor, to speed up the transfer process and compensate for lags that may be attributed to the payor's financial network.

In some examples, the P2P platform 1012 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1026 executing on the end user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1012 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 10 or a third-party service provider associated with the server(s) 1008. In examples where the content provider is a third-party service provider, the server(s) 1008 can be accessible via one or more APIs 1018 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1012 (e.g., the P2P platform 1012 offers a chat or messaging service that is within the payment application or accessible via the payment application). In some examples, the messaging application can be external to the P2P platform 1012. (e.g., the messaging application is hosted by a third-party service provider associated with the server(s) 1008, which can be accessible via one or more of the APIs 1018 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1012 can enable users 1016 to perform banking transactions via instances of the payment application 1026. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1012 can enable users to allocate funds between different accounts, sub-accounts, or balances (e.g., spending, saving, different assets, different currencies), etc. Further, users 1016 can configure bill pay, recurring payments, and/or the like using assets associated with their accounts. In some examples, the P2P platform 1012, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1012 enables users to buy and/or sell assets via asset networks such as cryptocurrency networks, securities networks, and/or the like. In some examples, acquisition of such assets can be in whole or fractional shares. The ledger system described below with reference to FIG. 11 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1012 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1012 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1012 can automatically apply the amount of funds associated with the gift card to the transaction.

In some examples, users can configure their account such that when they use their payment instruments, the P2P platform 1012 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1012 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1012 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1012 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1012.

In some examples, components of the environment 1000 may be integrated to enable payments at the point-of-sale using assets associated with user accounts of the P2P platform 1012. As illustrated in the environment 1000, the components can communicate with one another via the network 1004, where one or more APIs 1018 or other functional components can be used to facilitate such communication.

In at least one example, an integration can enable a customer to participate in a transaction via their own computing device (e.g., user device 1006(B)) instead of interacting with a merchant device of a merchant, such as the seller device 1006(A). In such an example, the POS application 1020, associated with a payment processing platform and executable by the seller device 1006(A) of the merchant, can present a Quick Response (QR) code, or other code that can be used to identify a transaction (e.g., a transaction code), in association with a transaction between the customer and the merchant. The QR code, or other transaction code, can be provided to the POS application 1020 via an API 1018 associated with the peer-to-peer payment platform. In an example, the customer can utilize their own computing device, such as the user device 1006(B), to capture the QR code, or the other transaction code, and to provide an indication of the captured QR code, or other transaction code, to server(s) 1002.

Based at least in part on the integration of the peer-to-peer payment platform and the payment processing platform (e.g., via the API 1018), the server(s) 1002 of the seller platform 1010 can exchange communications with a payment application 1026 associated with the P2P platform 1012 and/or the POS application 1020 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1012 and seller platform 1010 (which can be a first- or third-party integration) such that a QR code, or other transaction code, specific to the transaction can be used for providing transaction details, location details, customer details, or the like to a computing device of the customer, such as the user device 1006(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1006(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1020 and the payment application 1026, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1006(B), can be specially configured as a buyer-facing device having functionality similar to the functionality described above in the brick-and-mortar example.

In some examples, based at least in part on capturing the QR code, or other transaction code, the seller platform 1010 can provide transaction data to the P2P platform 1012 for presentation via the payment application 1026 on the computing device of the customer, such as the user device 1306B (B), to enable the customer to complete the transaction via their own computing device. In some examples, in response to receiving an indication that the QR code, or other transaction code, has been captured or otherwise interacted with via the customer computing device, the P2P platform 1012 can determine that the customer authorizes payment of the transaction using funds associated with a stored balance of the customer that is managed and/or maintained by the P2P platform 1012. Such authorization can be implicit such that the interaction with the transaction code can imply authorization of the customer. Alternatively or additionally, the P2P platform 1012 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1012 can transfer funds from the stored balance of the customer to the seller platform 1010. In at least one example, the seller platform 1010 can deposit the funds, or a portion thereof, into a stored balance of the merchant that is managed and/or maintained by the seller platform 1010. In such an example, the seller platform 1010 can be a "peer" to the customer in a peer-to-peer transaction.

In some examples, techniques described herein can enable the customer to interact with the transaction after payment for the transaction has been settled. For example, in at least one example, the seller platform 1010 can cause a total amount of a transaction to be presented via a user interface associated with the payment application 1026 such that the customer can provide gratuity, feedback, loyalty information, or the like, via an interaction with the user interface. In another example, the seller platform 1010 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1012, if the customer inputs a tip and/or an event affecting the total amount of the transaction is triggered, the P2P platform 1012 can transfer additional funds, associated with the tip or event, to the seller platform 1010. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1026 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1012 as described herein (e.g., a debit card linked to a stored balance of a customer) such that when the payment instrument is caused to interact with a payment reader, the seller platform 1010 can exchange communications with the P2P platform 1012 to authorize payment for a transaction and/or provision associated transaction data to a computing device of the customer associated with the transaction.

Turning now to media content functionality provided by the environment 1000, the media content platform 1014 can provide digital media to a content consumption device 1006(D) where playback may occur using "streaming." In examples, "streaming" media content involves encoding the media content and transmitting the encoded media content over the network 1004 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1014 can provide a digital media streaming service (e.g., subscription-based, non-subscription-based) that enables a content consumption device 1006(D) to stream and/or download digital media content via a listener application 1028 installed on the content consumption device 1006(D). For instance, the media content platform 1014 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1006(D), the listener application 1028 may verify access rights to the digital media content items at time intervals, for instance intermittently (e.g., when the content consumption device 1006(D) has a network connection with the media content platform 1014 via the network(s) 1004), and/or at regular intervals (e.g., daily, weekly, monthly, etc.). In examples, access rights to the digital media content items may be provided when a subscription to the media content platform 1014 is active, while access rights to the digital media content items may be withheld when the subscription to the media content platform 1014 is terminated. Enabling storage on the end user devices 1006 and subsequent access to digital media content items via the listener application 1028 provides the users 1016 with the ability to access the digital media content items "offline" such as when a connection to the media content platform 1014 via the network(s) 1004 is unavailable or unreliable.

In some examples, the media content platform 1014 may additionally or alternatively provide an artist management service that enables the users 1016 to manage aspects of artist business via an artist application 1030 installed on the artist device 1006(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1016 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1016 may have access to a single user account via respective end user devices 1006, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1030 and the listener application 1028 may be distinct applications having differing user experiences and verification processes for access, such as illustrated in the environment 1000. For instance, the media content platform 1014 may request additional verification, such as a link to an artist website, a sample of an artist's work, a verified credential supplied by a third party, etc. to grant access to the artist application 1030 in addition to information requested to access the listener application 1028. Further, the artist application 1030 may provide the artist management services described herein, without the subscription-based digital media streaming services described herein, and vice versa. However, examples are also considered in which functionality provided by the artist application 1030 and the listener application 1028 partially or fully overlap, and/or where verification processes for access are substantially similar.

In at least some examples, the media content platform 1014 enables interaction between the users 1016 utilizing the listener application 1028 installed on the content consumption devices 1006(D), and the users 1016 utilizing the artist application 1030 installed on the artist devices 1006 (E). For example, the media content platform 1014 may provide interconnectivity between the subscription-based digital media streaming service and the artist management service. Functionality provided by the media content platform 1014 in such instances may include a communication channel between one or more of the users 1016 (e.g., a listener, fan, music supervisor, publisher, etc.) utilizing the listener application 1028 and another user (e.g., an artist) of the users 1016 utilizing the artist application 1030. The communication channel may include, for instance, a messaging platform (also referred to as a "messaging application" herein), a live streaming platform, a videoconferencing or teleconferencing platform, and/or a combination of these.

Additionally, in some cases, the media content platform 1014 may facilitate a resource transfer between the listener application 1028 and the artist application 1030. In an example, the media content platform 1014 may direct a resource, such as a portion of a subscription fee paid by one of the users 1016 designated as a listener, to one or more of the users 1016 designated as artists based on a number of instances that the listening user consumed (e.g., streamed, downloaded, etc.) content created by respective ones of the artist users. Alternatively or additionally, the media content platform 1014 may direct a resource, such as funds, from an account associated with a listening user to an account associated with an artist user (or vice versa), in accordance with transfers between accounts as described herein. The media content platform 1014 may facilitate resource transfers in examples such as merchandise purchases, event ticket purchases, "tipping" an artist, payments for royalties or other fees, and so forth.

In some examples, the media content platform 1014 enables interaction between individual ones of the users 1016 with one another via the listener application 1028 installed on the content consumption device 1006(D) and other of the content consumption devices 1006(D) via a communication channel as described above. In an example, the listener application 1028 may provide functionality via a communication channel for a user to stream an individual digital media item, a playlist, or the like to an audience comprising other ones of the content consumption devices 1006(D). Alternatively or additionally, the communication channel may facilitate sharing of individual digital media items, playlists, user and/or artist profiles, and the like between the users 1016 via messages, uniform resource locators (URLs), quick response (QR) codes, and so forth.

In some cases, the media content platform 1014 enables interaction between individual ones of the users 1016 with one another via the artist application 1030 installed on the artist device 1006(E) and other of the artist devices 1006 via a communication channel as described above. In some instances, the media content platform 1014 may provide recommendations for a particular user indicating which of the other users 1016 to communicate with. Such a recommendation may be based on a similarity (or dissimilarity) of content created by two or more of the users 1016, an overlap (or lack thereof) of audience members of the users 1016, a geographic location of the users 1016, a coinciding event location of the users 1016, and so forth. In some examples, a user may input parameters for a desired connection via the artist application 1030, and the media content platform 1014 may filter which of the users 1016 to surface for recommendations to the user based on the input parameters. Alternatively or additionally, the media content platform 1014 may implement one or more machine learning models to filter which of the users 1016 to surface for recommendations to the user. The recommendations provided by the media content platform 1014 may be data driven and thus increase relevance of communications presented to the users 1016 and reduce unsolicited communications that may be received by the users 1016.

The media content platform 1014 may interact with the server(s) 1008 associated with the third-party service providers to, for instance, ingest digital media items, report digital media consumption data, pay royalties, and the like. In some examples, the server(s) 1008 may be accessible by the media content platform 1014 via one or more APIs 1018 or other integrations. In some cases, the third-party service provider may be a digital media content provider (e.g., a record label, a performance rights organization (PRO), an independent artist, etc.). In such cases, the media content platform 1014 may receive digital media content items from the server(s) 1008, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1014 may use the metadata to associate the digital media content item as being created by a particular user, to provide search results to the users 1016, to generate playlists, and so forth. Further, the media content platform 1014 may provide payments (e.g., royalties) to the third-party service provider based on a number of streams and/or downloads of individual digital media content items by the users via the listener application 1028.

Techniques described herein are directed to services provided via a distributed system of end user devices 1006 that are in communication with server(s) 1002 of the service provider. That is, techniques described herein are directed to a specific implementation—or, a practical application—of utilizing a distributed system of end user devices 1006 that are in communication with server(s) 1002 of the seller platform 1010, the P2P platform 1012, and/or the media content platform 1014 to perform a variety of services, as described above. The unconventional configuration of the distributed system described herein enables the server(s) 1002 that are remotely-located from end-users (e.g., users 1016) to intelligently offer services based on aggregated data associated with the end-users, such as the users 1016 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1010, the P2P platform 1012, and/or the media content platform 1014, and those outside of the control of these service providers, to track the standing (payables, receivables, payroll, invoices, appointments, capital, balances, collaborations, etc.) of the users 1016. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1016 and end user devices 1006. Furthermore, such features are changed dynamically based on the profiles of the users involved interacting with the GUIs. As such, techniques described herein are directed to improvements to computing systems.

The seller platform 1010, the P2P platform 1012, and/or the media content platform 1014 are capable of providing additional or alternative services, and the services described above are offered as a sampling of services. In at least one example, the seller platform 1010, the P2P platform 1012, and/or the media content platform 1014 can exchange data with the server(s) 1008 associated with third-party service providers. Such third-party service providers can provide information that enables the seller platform 1010, the P2P platform 1012, and/or the media content platform 1014 to provide services, such as those described above. In additional or alternative examples, such third-party service providers can access services of the seller platform 1010, the P2P platform 1012, and/or the media content platform 1014. That is, in some examples, the third-party service providers can be subscribers, or otherwise access, services of the seller platform 1010, the P2P platform 1012, and/or the media content platform 1014.

FIG. 11 illustrates an example environment 1100 including a service provider system 1102 which may be associated with the server(s) 1002 of FIG. 10. The environment 1100 may also include a user device 1104, which may correspond to any of the end user devices 1006 described in relation to FIG. 10. In examples, the service provider system 1102 may include one or a combination of the seller platform 1010, the P2P platform 1012, or the media content platform 1014, as well as one or more data store(s) 1106 that can store assets in an asset storage 1108, as well as data in user account(s) 1110. In some examples, the environment 1100 may also include a public blockchain 1114, one or more nodes 1116, and/or a hardware wallet 1118. The service provider system 1102, the user device 1104, public blockchain 1114, the node(s) 1116, and the hardware wallet 1118 may be connected and able to communicate via one or more networks 1120, which may have the same or similar functionality described in relation to the network 1004 of FIG. 10.

In some examples, user account(s) 1110 can include merchant account(s), customer account(s), media content subscriber account(s), artist account(s), and so forth. In at least one example, the asset storage 1108 can be used to record whether individual assets are registered to a user account 1110. For example, the asset storage 1108 can include asset wallet(s) 1122 for storing records of assets owned by the service provider system 1102, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1008 of FIG. 10 can be associated therewith.

The asset wallet 1122 can be associated with one or more addresses and can vary addresses used to acquire assets (e.g., from the asset network(s)) so that its holdings are represented under a variety of addresses on the asset network. In examples where the service provider system 1102 has holdings of cryptocurrency (e.g., in the asset wallet 1122), a user can acquire cryptocurrency directly from the service provider system 1102. In some examples, the service provider system 1102 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1102 can provide the same or similar functionality for securities or other assets.

The asset storage 1108 may contain ledgers that store records of assignments of assets to users 1016. Specifically, the asset storage 1108 may include asset ledger 1124, fiat currency ledger 1126, and/or other ledger(s) 1128, which can be used to record transfers of assets between users 1016 and/or one or more third-parties (e.g., merchant network(s), payment card network(s), ACH network(s), equities network(s), the asset network, securities networks, etc.). In doing so, the asset storage 1108 can maintain a running balance of assets managed by the service provider system 1102. The ledger(s) of the asset storage 1108 can further indicate some of the running balance for individual ledger(s) stored in the asset storage 1108 are assigned or registered to one or more user account(s) 1110.

In at least one example, the asset storage 1108 can include transaction logs 1130, which can include, as transaction data, records of past transactions involving the service provider system 1102 and/or the user account 1110. In some examples, the data store(s) 1106 can store a private blockchain 1132. A private blockchain 1132 can function to record sender addresses, recipient addresses, public keys, values of cryptocurrency transferred, and/or can be used to verify ownership of cryptocurrency tokens to be transferred. In some examples, the service provider system 1102 can record transactions involving cryptocurrency until the number of transactions has exceeded a determined limit (e.g., number of transactions, storage space allocation, etc.). Based at least in part on determining that the limit has been reached, the service provider system 1102 can publish the transactions in the private blockchain 1132 to the public blockchain 1114 (e.g., associated with the asset network), where miners can verify the transactions and record the transactions to blocks on the public blockchain 1114. In at least one example, the service provider system 1102 can participate as miner(s) at least for transactions to which the respective platform is a party to, to be posted to the public blockchain 1114.

In some cases, the data store(s) 1106 can store and/or manage multiple user accounts, an example of which is described in relation to the user account 1110. In at least one example, the user account 1110 can include user account data 1134, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1134 can include account activity 1136 and user wallet key(s) 1138. In some examples, the user wallet key(s) 1138 can include a public-private key-pair and a respective address associated with the asset network or other asset networks. In some examples, the user wallet key(s) 1138 may include one or more key pairs, which can be unique to the asset network or other asset networks.

In addition to the user account data 1134, the user account 1110 can include ledger(s) for account(s) managed by the service provider system 1102, for the user. For example, the user account 1110 may include an asset ledger 1124, a fiat currency ledger 1126, and/or one or more other ledgers 1128. The ledger(s) can indicate that a corresponding user utilizes the service provider system 1102 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1102.

In some examples, the asset ledger 1124 can store a balance for each of one or more cryptocurrencies (e.g., Bitcoin, Ethereum, Litecoin, etc.) registered to the user account 1110. In at least one example, the asset ledger 1124 can further record transactions of cryptocurrency assets associated with the user account 1110. For example, the user account 1110 can receive cryptocurrency from the asset network using the user wallet key(s) 1138. In some examples, the user wallet key(s) 1138 may be generated for the user upon request. User wallet key(s) 1138 can be requested by the user in order to send, exchange, or otherwise control the balance of cryptocurrency held by the service provider system 1102 (e.g., in the asset wallet 1122) and registered to the user. In some examples, the user wallet key(s) 1138 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1102 and the value is credited as a balance in asset ledger 1124), by purchasing currency in the form associated with the account using currency in a different form (e.g., buying a value of cryptocurrency from the service provider system 1102 using a value of fiat currency reflected in fiat currency ledger 1126, and crediting the value of cryptocurrency in asset ledger 1124), or by conducting a transaction with another user (customer or merchant) of the service provider system 1102 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1102 (i.e., an external account). Such a transaction can request that the user to transfer an amount of the cryptocurrency in a message signed by user's private key to an address provided by the service provider system 1102. In at least one example, the transaction can be sent to miners to bundle the transaction into a block of transactions and to verify the authenticity of the transactions in the block. Once a miner has verified the block, the block is written to the public blockchain 1114 where the service provider system 1102 can then verify that the transaction has been confirmed and can credit the user's asset ledger 1124 with the transferred amount. When an account is funded by transferring cryptocurrency from a third-party cryptocurrency wallet, an update can be made to the public blockchain 1114. In some cases, this update of the public blockchain 1114 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1102. As described above, in some examples, the service provider system 1102 can acquire cryptocurrency from a third-party source. In examples where the service provider system 1102 has its own cryptocurrency assets, cryptocurrency transferred in a transaction (e.g., data with address provided for receipt of transaction and a balance of cryptocurrency transferred in the transaction) can be stored in an asset wallet 1122 associated with the service provider system 1102. In at least one example, the service provider system 1102 can credit the asset ledger 1124 of the user. Additionally, while the service provider system 1102 recognizes that the user retains the value of the transferred cryptocurrency through crediting the asset ledger 1124, an inspection of the blockchain will show the cryptocurrency as having been transferred to the service provider system 1102. In some examples, the asset wallet 1122 can be associated with many different addresses. In such examples, an inspection of the blockchain may not necessarily associate all cryptocurrency stored in asset wallet 1122 as belonging to the same entity. The presence of a private ledger used for real-time transactions and maintained by the service provider system 1102, combined with updates to the public ledger at other times, allows for extremely fast transactions using cryptocurrency to be achieved. In some examples, the "private ledger" can refer to the asset ledger 1124, which in some examples, can utilize the private blockchain 1132, as described herein. The "public ledger" can correspond to the public blockchain 1114 associated with the asset network.

In at least one example, an asset ledger 1124, fiat currency ledger 1126, or the like associated with the user account 1110 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1124. In some examples, a user can receive fiat currency or another currency in the form of payment for a transaction with another user. In at least one example, at least a portion of such funds can be converted into cryptocurrency by the service provider system 1102 and used to fund the asset ledger 1124 of the user.

In examples, a user can also have an account in U.S. dollars, which can be tracked, for example, via the fiat currency ledger 1126. Such an account can be funded by transferring money from a bank account at a third-party bank to an account maintained by the service provider system 1102 as is conventionally known. In some examples, a user can receive fiat currency in the form of payment for a transaction with another user. In such examples, at least a portion of such funds can be used to fund the fiat currency ledger 1126.

In some examples, a user can have one or more internal payment cards registered with the service provider system 1102. Internal payment cards can be linked to one or more of the accounts associated with the user account 1110. In some embodiments, options with respect to internal payment cards can be adjusted and managed using an application (e.g., the payment application 1026, a wallet application 1112, etc.).

In at least one example, the user account 1110 can be associated with the asset wallet accessible via a wallet application 1112 of the user device 1104, or a stored balance for use in payment transactions, peer-to-peer transactions, payroll payments, etc. In at least one example, the asset wallet 1122 can store data indicating an address provided for receipt of a cryptocurrency transaction. In at least one example, the balance of the asset wallet 1122 can be based at least in part on a balance of the asset ledger 1124. In at least one example, funds availed via the asset wallet 1122 can be stored in the asset wallet 1122. Funds availed via the asset wallet 1122 can be tracked via the asset ledger 1124. The asset wallet 1122, however, can be associated with additional cryptocurrency funds.

In at least one example, when the service provider system 1102 includes a private blockchain 1132 for recording and validating cryptocurrency transactions, the asset wallet 1122 can be used instead of, or in addition to, the asset ledger 1124. For example, a merchant can provide the address of the asset wallet 1122 for receiving payments. In an example where a customer is paying in cryptocurrency and the customer has their own cryptocurrency wallet account associated with the service provider system 1102, the customer can send a message signed by its private key including its wallet address (i.e., of the customer) and identifying the cryptocurrency and value to be transferred to the merchant's asset wallet 1122. The service provider system 1102 can complete the transaction by reducing the cryptocurrency balance in the customer's cryptocurrency wallet and increasing the cryptocurrency balance in the merchant's asset wallet 1122. In addition to recording the transaction in the respective cryptocurrency wallets, the transaction can be recorded in the private blockchain 1132 and the transaction can be confirmed. A user can perform a similar transaction with cryptocurrency in a peer-to-peer transaction as described above.

While the asset ledger 1124 and/or asset wallet 1122 are each described above with reference to cryptocurrency, the asset ledger 1124 and/or asset wallet 1122 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1102 is an aspect of the technology disclosed that enables technical advantages of increased processing speed and improved security.

The description of the environment 1100 above generally relates to a centralized service provider that at least partially facilitates storing and managing assets in the data store 1106. However, the environment 1100 may also facilitate decentralized storage and management of assets alternatively or in addition to centralized storage and management as described above. For instance, the environment 1100 may include a decentralized platform implemented using a plurality of nodes (e.g., web nodes), an example of which is illustrated as node 1116. The node 1116 is representative of a computer or other device tasked with validating transactions and/or maintaining a copy of a blockchain ledger, such as a ledger associated with the public blockchain 1114. The decentralized platform may be implemented via the environment 1100 through use of decentralized identifiers and verifiable credentials that are stored and managed by user devices 1104. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1102). The decentralized identity referenced by a decentralized identifier gives an entity control over what data can be accessed, stored, modified, and so forth by other entities, such as the service provider system 1102.

The node 1116, as representative of one of a plurality of decentralized nodes (e.g., decentralized web nodes), supports data storage and relays that allows entities, service provider systems, individuals, organizations and so forth to send, store, and receive encrypted or public messages and data. The node 1116 is universally addressable and is "crawlable" using data addressing in relation to the decentralized identifiers. The node 1116 is also configured to support decentralized replication of data across the nodes that is consistent across multiple nodes over time through continued data communication between the nodes in the decentralized platform. The node 1116 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1104 may be an issuer, a holder, and/or a verifier, as can the service provider system 1102.

In some examples, the user device 1104 may implement a wallet application 1112 configured to manage decentralized identifiers and/or verifiable credentials. For instance, the wallet application 1112 may provide a user interface for implementation of access controls to various data associated with the decentralized identifier by the service provider system 1102, to other user devices, and so forth. Additionally, the wallet application 1112 may be configured to provide functionality for resource transfers (e.g., cryptocurrency, fiat currency, etc.) with the service provider system 1102, other user devices, and the like, based on techniques described herein.

In some examples, the hardware wallet 1118 may store cryptocurrency assets in combination with the wallet application 1112 and the service provider system 1102. For instance, the hardware wallet 1118, the wallet application 1112, and the service provider system 1102 may each store a respective, different private key, where a transaction with the cryptocurrency assets is signed by at least two of the three private keys. The user interface provided by the wallet application 1112 may allow a user to request a transaction. The wallet application 1112 may then sign the transaction with the private key of the wallet application 1112, have either the hardware wallet 1118 or the service provider system 1102 use a second of the three private keys to sign the transaction, and then provide the transaction with two signatures to the public blockchain 1114 for processing.

Figure 12:
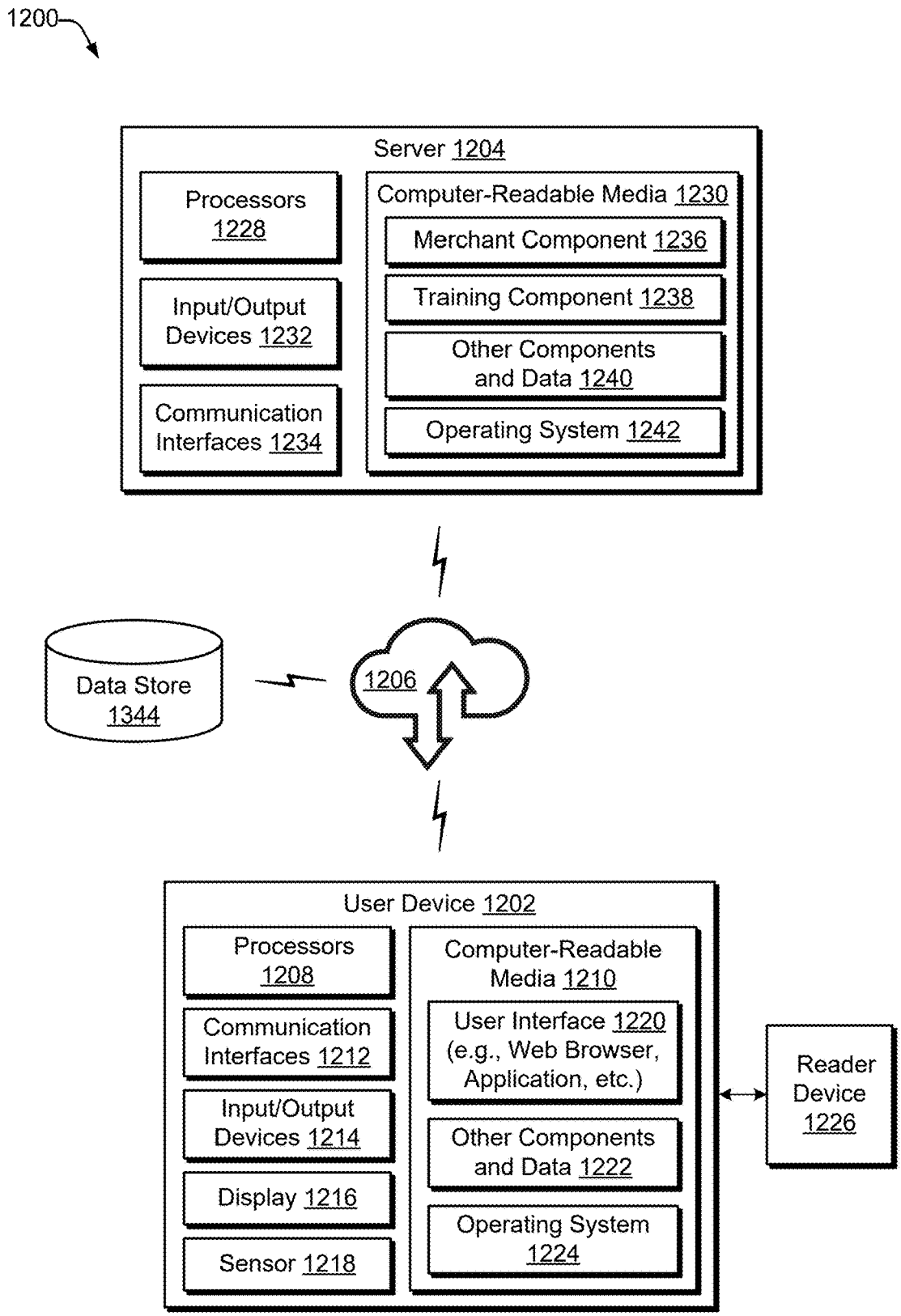
FIG. 12 is a non-limiting example illustrating an environment in which collaboration recommendation techniques described herein are performed in accordance with one or more implementations.

FIG. 12 depicts an illustrative block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 10.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below. The user device 1202 may be representative of, and provide functionality for, the user devices 1006 described in relation to FIG. 10.

In the illustrated example, the user device 1202 includes one or more processors 1208, one or more computer-readable media 1210, one or more communication interface(s) 1212, one or more input/output (I/O) devices 1214, a display 1216, sensor(s) 1218, one or more encoders 1246, and one or more decoders 1248.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In some examples, the user interface 1220 can be the collaboration interface 144 or the recommendation interface 150, such as the example user interfaces described and illustrated with respect to FIGS. 3-9. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, user movement tracking techniques, eye tracking techniques, etc. to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtual reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. In some examples, the user device 1202 may not include the display 1216, and information can be presented by other means, such as aurally, haptically, etc.

In addition, the user device 1202 can include sensor(s) 1218. The sensor(s) 1218 can include a global positioning system ("GPS") device able to indicate location information. Further, the sensor(s) 1218 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1010, the P2P platform 1012, and/or the media content platform 1014, described above, to provide one or more services. That is, in some examples, the service provider can implement geofencing to provide particular services to users by the seller platform 1010, the P2P platform 1012, and/or the media content platform 1014.

In examples, the user device 1202 includes a codec system, which may comprise an encoder 1246 and/or a decoder 1248. The encoder 1246 is configured to encode a data stream or signal from an analog signal (e.g., an analog audio signal, an analog video signal, etc.) to a digital signal for transmission or storage. The decoder 1248 is configured to convert the digital signal back to an analog signal, such as for playback or editing. In some cases, the encoder 1246 may be configured to encode the data stream or analog signal in an encrypted format, and the decoder 1248 may accordingly be configured to decrypt the digital signal as part of the decoding process (e.g., using a cryptographic key). Additionally, in some examples, the encoder 1246 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1246 and/or the decoder 1248 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1200, the server 1204 may include an encoder 1246 and/or a decoder 1248 as well.

Additionally, the user device 1202 can include various other components that are not shown, examples of which include removable storage, a power source, such as a battery and power control unit, a barcode scanner, a printer, a cash drawer, and so forth.

In addition, as described in relation to FIG. 10, the user device 1202 can include, be connectable to, or otherwise be coupled to a reader device 1226, for reading payment instruments and/or identifiers associated with payment objects. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe, a dip, or a tap to obtain payment data associated with a customer. Additionally or optionally, the reader device 1226 may also include a biometric sensor to receive and process biometric characteristics and process them as payment instruments, given that such biometric characteristics are registered with the payment service and connected to a financial account with a bank server. The reader device 1226 may include processing unit(s), computer-readable media, a reader chip, a transaction chip, a timer, a clock, a network interface, a power supply, and so on. That is, the reader device 1226 may include any of the computing components described herein with reference to the user device 1202 to implement the functionality provided by the reader device 1226.

In examples, the reader device 1226 includes a reader chip, which may perform functionality to control the power supply, among other functionality of the reader device 1226. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The reader device 1226 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1202, which can be a POS terminal, and the reader device 1226 are shown as separate devices, in additional or alternative examples, the user device 1202 and the reader device 1226 can be part of a single device, which may be a battery-operated device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the seller platform 1010, the P2P platform 1012, and/or the media content platform 1014. Functional components stored in the computer-readable media 1230 can optionally include a merchant component 1236, a training component 1238, and one or more other components and data 1240. The computer-readable media 1230 can additionally include an operating system 1242 for controlling and managing various functions of the server(s) 1204, such as functionality provided by the recommendation system 130.

The merchant component 1236 can be configured to receive transaction data from POS systems, such as the POS system 1024 described above with reference to FIG. 10. The merchant component 1236 can transmit requests (e.g., authorization, capture, settlement, etc.) to payment service server computing device(s) to facilitate POS transactions between merchants and customers. The merchant component 1236 can communicate the successes or failures of the POS transactions to the POS systems.

The training component 1238 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more other components and data 1240 can include the recommendation system 130, the model(s) 132, and the correlation engine 134, the functionality of which is described above. Further, the one or more other components and data 1240 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, as described herein.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206. In at least one example, the datastore 1244 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Clause 1. A method comprising: monitoring, by a media content platform, consumption of at least one media content item associated with an artist, by multiple user accounts, on the media content platform; identifying, by the media content platform, a subset of the multiple user accounts that satisfy an engagement threshold for the artist; presenting, by the media content platform, a user interface to the subset of the multiple user accounts that includes at least one prompt for feedback regarding a future collaboration by the artist with at least one different artist; and generating, by the media content platform, a recommendation based on the feedback provided by the subset of the multiple user accounts via the user interface and communicating the recommendation to the artist.

Clause 2. The method of clause 1, wherein identifying the subset of the multiple user accounts that satisfy the engagement threshold for the artist is based on one or more of: a threshold number of streams, by a user account of the multiple user accounts, of the at least one media content item associated with the artist; a threshold percentage of streams, by a user account of the multiple user accounts, of the at least one media content item associated with the artist; a threshold number of shares of the artist, by a user account of the multiple user accounts, with at least one other user account; attendance at one or more events by the artist, by a user associated with a user account of the multiple user accounts; a user account of the multiple user accounts engaging with a threshold percentage of media content items associated with the artist; or past participation in artist collaboration recommendations on the media content platform.

Clause 3. The method of clause 1 or clause 2, wherein identifying the subset of the multiple user accounts that satisfy the engagement threshold for the artist comprises verifying that each user account in the subset of the multiple user accounts via at least one of a subscription to the media content platform, a verifiable credential issued by a trusted authority, or completion of a proof-of-human test.

Clause 4. The method of any of clauses 1-3, wherein presenting the user interface for one of the subset of the multiple user accounts is performed during the one of the subset of the multiple user accounts consuming the at least one media content item associated with the artist or within a threshold time of the subset of the multiple user accounts consuming the at least one media content item associated with the artist.

Clause 5. The method of any of clauses 1-4, wherein presenting the user interface comprises inviting the subset of the multiple user accounts to navigate to the user interface during a predetermined time window.

Clause 6. The method of any of clauses 1-5, wherein the user interface is configured as a collaborative fan space that enables the subset of the multiple user accounts to communicate with one another.

Clause 7. The method of any of clauses 1-6, wherein the user interface includes controls that enable selection of characteristics of the artist and the at least one different artist to recommend including in the future collaboration.

Clause 8. The method of any of clauses 1-3, wherein the characteristics include audible characteristics associated with the artist including one or more of vocal, melody, rhythm, harmony, hook, beat, instrumentation, timbre, dynamics, or texture characteristics.

Clause 9. The method of any of clauses 1-8, wherein the user interface includes a selectable control to provide the selected characteristics of the artist and the at least one different artist as inputs to a generative model trained to generate synthetic media content based on the inputs.

Clause 10. The method of any of clauses 1-9, wherein the user interface includes a preview of a collaboration between the artist and the at least one different artist.

Clause 11. The method of any of clauses 1-10, wherein the recommendation includes information describing the subset of the multiple user accounts.

Clause 12. The method of any of clauses 1-11, wherein the recommendation is communicated to the artist with a selectable option to initiate communication with one or more user accounts in the subset of the multiple user accounts.

Clause 13. The method of any of clauses 1-12, wherein generating the recommendation based on the feedback provided by the subset of the multiple user accounts comprises weighting feedback received from one of the subset of the multiple user accounts based on at least one of: a threshold number of streams, of the at least one media content item associated with the artist, by the one of the subset of the multiple user accounts; a threshold percentage of streams, of the at least one media content item associated with the artist, by the one of the subset of the multiple user accounts; a threshold number of shares of the artist by the one of the subset of the multiple user accounts; attendance, by a user associated with the one of the subset of the multiple user accounts, at one or more events associated with the artist; a threshold percentage of media content items associated with the artist with which the one of the subset of the multiple user accounts has engaged; or past participation in artist collaboration recommendations on the media content platform by the one of the subset of the multiple user accounts.

Clause 14. A method comprising: identifying, by a media content platform, multiple user accounts that satisfy an engagement threshold for an artist; outputting, by the media content platform, a collaboration interface forum at a plurality of different computing devices that each correspond to a different one of the multiple user accounts, the collaboration interface forum: including a portion that facilitates communication among the multiple user accounts; and including at least one prompt for feedback regarding a collaboration by the artist with at least one different artist; generating, by the media content platform, a summary of communications among the multiple user accounts and a recommendation for the artist based on inputs by the multiple user accounts to the collaboration interface; and outputting, by the media content platform, the summary of the communications and the recommendation for the artist via a recommendation interface at a computing device associated with the artist.

Clause 15. The method of clause 14, wherein the collaboration interface forum includes controls that enable selection of characteristics of the artist and the at least one different artist to recommend including in a future collaboration.

Clause 16. The method of clause 15, wherein the characteristics include audible characteristics associated with the artist including one or more of vocal, melody, rhythm, harmony, hook, beat, instrumentation, timbre, dynamics, or texture characteristics.

Clause 17. The method of clause 15 or clause 16, wherein the user interface includes a selectable control to provide the selected characteristics of the artist and the at least one different artist as inputs to a generative model trained to generate synthetic media content based on the inputs.

Clause 18. A method comprising: identifying, by a media content platform, that consumption of at least one media content item associated with a first artist, by a user account, satisfies an engagement threshold for the first artist; identifying, by the media content platform, that consumption of at least one media content item associated with a second artist, by the user account, satisfies an engagement threshold for the second artist; outputting, by the media content platform, a user interface to a computing device associated with the user account, the user interface including: at least one control that is selectable to define characteristics of the at least one media content item associated with the first artist for inclusion in a collaboration; and at least one control that is selectable to define characteristics of the at least on media content item associated with the second artist for inclusion in the collaboration; and generating, by the media content platform, the collaboration by providing selected characteristics of the at least one media content item associated with the first artist and selected characteristics of the at least one media content item associated with the second artist as inputs to a machine learning model trained to generate media content items.

Clause 19. The method of clause 18, wherein the user interface further includes a preview of the collaboration.

Clause 20. The method of clause 18 or clause 19, wherein the user interface is output during consumption by the user account of at least at least one media content item of the first artist or the second artist.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   monitoring, by a media content platform, consumption of at least one media content item associated with an artist, by multiple user accounts, on the media content platform;
   identifying, by the media content platform, a subset of the multiple user accounts that satisfy an engagement threshold for the artist;
   presenting, by the media content platform, a user interface to the subset of the multiple user accounts that includes at least one prompt for feedback regarding a future collaboration by the artist with at least one different artist; and
   generating, by the media content platform, a recommendation based on the feedback provided by the subset of the multiple user accounts via the user interface and communicating the recommendation to the artist.

2. The method of claim 1, wherein identifying the subset of the multiple user accounts that satisfy the engagement threshold for the artist is based on one or more of:
   a threshold number of streams, by a user account of the multiple user accounts, of the at least one media content item associated with the artist;
   a threshold percentage of streams, by a user account of the multiple user accounts, of the at least one media content item associated with the artist;
   a threshold number of shares of the artist, by a user account of the multiple user accounts, with at least one other user account;
   attendance at one or more events by the artist, by a user associated with a user account of the multiple user accounts;
   a user account of the multiple user accounts engaging with a threshold percentage of media content items associated with the artist; or
   past participation in artist collaboration recommendations on the media content platform.

3. The method of claim 1, wherein identifying the subset of the multiple user accounts that satisfy the engagement threshold for the artist comprises verifying that each user account in the subset of the multiple user accounts via at least one of a subscription to the media content platform, a verifiable credential issued by a trusted authority, or completion of a proof-of-human test.

4. The method of claim 1, wherein presenting the user interface for one of the subset of the multiple user accounts is performed during the one of the subset of the multiple user accounts consuming the at least one media content item associated with the artist or within a threshold time of the one of the subset of the multiple user accounts consuming the at least one media content item associated with the artist.

5. The method of claim 1, wherein presenting the user interface comprises inviting the subset of the multiple user accounts to navigate to the user interface during a predetermined time window.

6. The method of claim 1, wherein the user interface is configured as a collaborative fan space that enables the subset of the multiple user accounts to communicate with one another.

7. The method of claim 1, wherein the user interface includes controls that enable selection of characteristics of the artist and the at least one different artist to recommend including in the future collaboration.

8. The method of claim 7, wherein the characteristics include audible characteristics associated with the artist that include one or more of vocal, melody, rhythm, harmony, hook, beat, instrumentation, timbre, dynamics, or texture characteristics.

9. The method of claim 7, wherein the user interface includes a selectable control to provide selected characteristics of the artist and the at least one different artist as inputs to a generative model trained to generate synthetic media content based on the inputs.

10. The method of claim 1, wherein the user interface includes a preview of a collaboration between the artist and the at least one different artist.

11. The method of claim 1, wherein the user interface includes a generative control that enables the multiple user accounts to create synthetic collaborations, and the method further includes:
    receiving, from a user account of the multiple user accounts, selected parts of artist tracks associated with respective artists;
    providing the selected parts of the artist tracks as inputs to a generative model;
    outputting, by the generative model, synthetically generated content based on the inputs; and
    providing the synthetically generated content to the user account.

12. The method of claim 1, wherein the recommendation is communicated to the artist with a selectable option to initiate communication with one or more user accounts in the subset of the multiple user accounts.

13. The method of claim 1, wherein generating the recommendation based on the feedback provided by the subset of the multiple user accounts comprises weighting feedback received from one of the subset of the multiple user accounts based on at least one of:
    a threshold number of streams, of the at least one media content item associated with the artist, by the one of the subset of the multiple user accounts;
    a threshold percentage of streams, of the at least one media content item associated with the artist, by the one of the subset of the multiple user accounts;
    a threshold number of shares of the artist by the one of the subset of the multiple user accounts;
    attendance, by a user associated with the one of the subset of the multiple user accounts, at one or more events associated with the artist;
    a threshold percentage of media content items associated with the artist with which the one of the subset of the multiple user accounts has engaged; or
    past participation in artist collaboration recommendations on the media content platform by the one of the subset of the multiple user accounts.

14. A method comprising:
    identifying, by a media content platform, multiple user accounts that satisfy an engagement threshold for an artist;
    outputting, by the media content platform, a collaboration interface forum at a plurality of different computing devices that each correspond to a different one of the multiple user accounts, the collaboration interface forum:
   including a portion that facilitates communication among the multiple user accounts; and
   including at least one prompt for feedback regarding a collaboration by the artist with at least one different artist;
generating, by the media content platform, a summary of communications among the multiple user accounts and a recommendation for the artist based on inputs by the multiple user accounts to the collaboration interface; and
outputting, by the media content platform, the summary of the communications and the recommendation for the artist via a recommendation interface at a computing device associated with the artist.

15. The method of claim 14, wherein the collaboration interface forum includes controls that enable selection of characteristics of the artist and the at least one different artist to recommend including in a future collaboration.

16. The method of claim 15, wherein the characteristics include audible characteristics associated with the artist that include one or more of vocal, melody, rhythm, harmony, hook, beat, instrumentation, timbre, dynamics, or texture characteristics.

17. The method of claim 15, wherein the collaboration interface forum includes a selectable control to provide selected characteristics of the artist and the at least one different artist as inputs to a generative model trained to generate synthetic media content based on the inputs.

18. A method comprising:
   identifying, by a media content platform, that consumption of at least one media content item associated with a first artist, by a user account, satisfies an engagement threshold for the first artist;
   identifying, by the media content platform, that consumption of at least one media content item associated with a second artist, by the user account, satisfies an engagement threshold for the second artist;
   outputting, by the media content platform, a user interface to a computing device associated with the user account, the user interface including:
      at least one control that is selectable to define characteristics of the at least one media content item associated with the first artist for inclusion in a collaboration; and
      at least one control that is selectable to define characteristics of the at least one on media content item associated with the second artist for inclusion in the collaboration; and
   generating, by the media content platform, the collaboration by providing selected characteristics of the at least one media content item associated with the first artist and selected characteristics of the at least one media content item associated with the second artist as inputs to a machine learning model trained to generate media content items.

19. The method of claim 18, wherein the user interface further includes a preview of the collaboration.

20. The method of claim 18, wherein the user interface is output during consumption by the user account of at least the at least one media content item associated with the first artist or the at least one media content item associated with the second artist.

* * * * *